(12) United States Patent
Swittel et al.

(10) Patent No.: US 12,516,931 B2
(45) Date of Patent: Jan. 6, 2026

(54) LASER LEVEL MOUNTING DEVICE

(71) Applicant: Milwaukee Electric Tool Corporation, Brookfield, WI (US)

(72) Inventors: Thomas C. Swittel, Brookfield, WI (US); John Norbert Winkler, Milwaukee, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 534 days.

(21) Appl. No.: 17/879,273

(22) Filed: Aug. 2, 2022

(65) Prior Publication Data

US 2023/0033519 A1 Feb. 2, 2023

Related U.S. Application Data

(63) Continuation of application No. PCT/US2022/038810, filed on Jul. 29, 2022.

(60) Provisional application No. 63/227,685, filed on Jul. 30, 2021.

(51) Int. Cl.
*G01C 15/00* (2006.01)
*G01C 9/02* (2006.01)

(52) U.S. Cl.
CPC ............ *G01C 15/004* (2013.01); *G01C 9/02* (2013.01)

(58) Field of Classification Search
CPC . G01C 15/004; G01C 9/02; F16B 2/12; F16B 2/06; F16B 2/065; B25B 1/2484; B25B 1/103; B25B 1/2463; F16M 13/02
USPC ..... 248/228.3, 229.15, 229.25, 228.6, 230.6, 248/23.71
See application file for complete search history.

(56) References Cited

U.S. PATENT DOCUMENTS

| | | | |
|---|---|---|---|
| 4,121,815 A * | 10/1978 | Paterson | B25B 5/102 269/203 |
| 5,033,709 A | 7/1991 | Yuen | |
| 5,495,675 A * | 3/1996 | Huang | F41G 1/35 33/DIG. 21 |
| 6,398,175 B1 * | 6/2002 | Conner | B25B 1/2405 248/228.3 |
| 6,964,106 B2 | 11/2005 | Sergyeyenko et al. | |
| 7,441,981 B2 * | 10/2008 | Crain | F16M 11/10 403/321 |

(Continued)

FOREIGN PATENT DOCUMENTS

| CN | 202041207 | 11/2011 |
|---|---|---|
| CN | 109084823 | 12/2018 |

(Continued)

OTHER PUBLICATIONS

International Search Report and Written Opinion for International Application No. PCT/US2022/038810 dated Nov. 16, 2022, 12 pages.

*Primary Examiner* — Christopher Garft
(74) *Attorney, Agent, or Firm* — Reinhart Boerner Van Deuren s.c.

(57) ABSTRACT

Various laser mount designs are shown. The laser mount includes a body, a movable laser platform and a connection mechanism to clamp onto a surface and/or object. The connection mechanism includes a retention plate, a threaded rod, guide rods, a pair of connection jaws or clamps and a clamp adjustment screw knob configured to move both connection jaws. The connection jaws are designed to clamp onto a variety of surface shapes and material sizes.

18 Claims, 23 Drawing Sheets

(56) References Cited

U.S. PATENT DOCUMENTS

| | | | |
|---|---|---|---|
| 7,669,816 B2 * | 3/2010 | Crain | F16M 11/10 |
| | | | 248/183.3 |
| 8,191,851 B2 | 6/2012 | Crown | |
| 8,267,365 B2 | 9/2012 | Wiest et al. | |
| 8,490,937 B2 * | 7/2013 | Crain | F16M 11/041 |
| | | | 248/316.4 |
| 8,511,635 B2 | 8/2013 | Steffen | |
| 8,668,182 B2 | 3/2014 | Steffen et al. | |
| 9,389,074 B2 | 7/2016 | Esposito | |
| 9,513,121 B2 * | 12/2016 | Kallabis | F16M 13/00 |
| D812,452 S | 3/2018 | Matteo | |
| 2010/0276554 A1 * | 11/2010 | Steffen | G01C 15/004 |
| | | | 248/274.1 |
| 2010/0276555 A1 * | 11/2010 | Steffen | G01C 15/004 |
| | | | 248/274.1 |
| 2020/0083658 A1 | 3/2020 | Xu | |
| 2020/0225034 A1 | 7/2020 | Gould et al. | |
| 2022/0152784 A1 * | 5/2022 | Janosch | G01C 15/004 |
| 2022/0395963 A1 * | 12/2022 | Draeger | B25B 5/102 |

FOREIGN PATENT DOCUMENTS

| | | |
|---|---|---|
| DE | 8227912 | 2/1983 |
| EP | 0787972 | 10/2003 |
| EP | 2808647 | 6/2019 |
| JP | 2005297096 | 10/2005 |
| KR | 101577648 | 12/2015 |
| KR | 101627564 | 5/2016 |
| KR | 101747021 | 6/2017 |
| KR | 1020200019029 | 2/2020 |
| WO | WO18147433 | 8/2018 |

\* cited by examiner

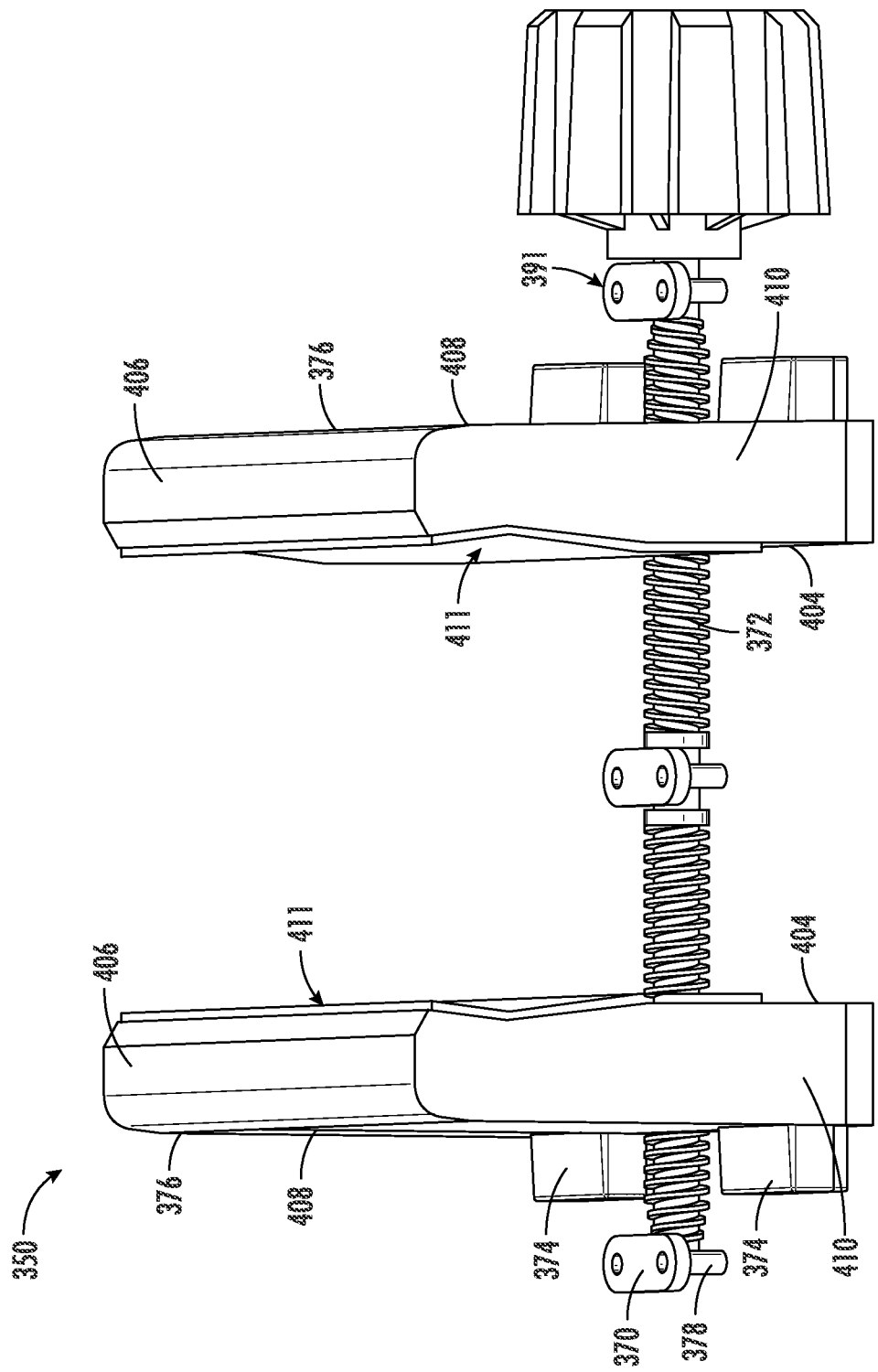

LASER LEVEL MOUNTING DEVICE

CROSS-REFERENCE TO RELATED PATENT APPLICATIONS

The present application is a continuation of International Application No. PCT/US2022/038810, filed Jul. 29, 2022, which claims the benefit of and priority to U.S. Provisional Application No. 63/227,685, filed on Jul. 30, 2021, each of which is incorporated herein by reference in its entirety.

BACKGROUND OF THE INVENTION

The present invention relates generally to the field of tools. The present invention relates specifically to a mount or wall mount for a laser projection device such as a rotary laser level with the ability be mounted to vertical or horizontal surfaces.

SUMMARY OF THE INVENTION

One embodiment of the invention relates to a mount for a laser projection device including a body portion, a platform, and a clamping connection mechanism. The body portion includes a front surface and rear surface. The platform has an adjustable position relative to the front surface of the body portion along a length of the body portion and include a mount configured to securely engage a laser projection device. The clamping connection mechanism is coupled to the rear surface of the body portion. The clamping connection mechanism includes a pair of jaw connection plates, an adjustment rod, and a screw knob. The pair of jaw connection plates extend outward from the rear surface of the body portion and include an inward facing surface that opposes the inward facing surface of the remaining jaw connection plate. The adjustment rod extends between and couples the pair of jaw connection plates together. The screw knob is coupled to an end of the adjustment rod. When the screw knob is turned, a distance between the pair of jaw connection plates is changed. When the distance is a clamping distance, the jaw connection plates are configured to engage a flat surface or a curved surface such that the mount is supported from the flat surface or the curved surface.

Another embodiment of the invention relates to a laser level wall mount including a body, a laser platform, and a clamping mechanism. The body includes a front surface and rear surface. The laser platform is configured to couple to a laser level device and is adjustable relative to the front surface of the body. The clamping mechanism extends away from the rear surface of the body. The clamping mechanism includes a pair of jaw connection plates, an adjustment rod, and a screw knob. The pair of jaw connection plates extend outward from the rear surface of the body and each jaw connection plate includes an inward facing surface. The inward facing surface is configured to grasp an object. The adjustment rod extends between and couples the pair of jaw connection plates together. The screw knob is coupled to an end of the adjustment rod. A pair of feet extend away from the rear surface of the body. The pair of feet are positioned below the clamping mechanism.

Another embodiment of the invention relates to a laser level wall mount including a body, a laser platform, and a clamping mechanism. The body includes a front surface and rear surface. The laser platform is adjustable relative to the front surface of the body and includes a mount configured to securely engage a laser level device. The clamping mechanism is coupled to the rear surface of the body. The clamping mechanism includes pair of jaw connection plates, an adjustment rod, and a screw knob. The pair of jaw connection plates extend outward from the rear surface of the body and each jaw connection plate includes an inward facing surface. The inward facing surface includes a horizontal portion, a first angled portion, and a second angled portion. The first angled portion is positioned between the horizontal portion and the second angled portion. The adjustment rod extends between and couples the pair of jaw connection plates together. The screw knob is coupled to an end of the adjustment rod. A pair of feet extend away from the rear surface of the body. The pair of feet are positioned below the clamping mechanism.

Another embodiment of the invention relates to a laser level wall mount including a body portion, a laser platform, and a clamping connection mechanism. The laser platform is adjustable relative to the body of the laser level wall mount. The clamping connection mechanism is coupled to a rear surface of the laser level mount and configured to grasp and/or hold onto a surface or material. The clamping connection mechanism includes a retention plate, a threaded rod, guide rods, a pair clamps or connection jaw plates and a clamp adjustment screw knob. The connection jaw plates are received within the retention plate and the threaded rod and guide rods extend between the pair of connection jaw plates. The threaded rod includes both right-handed and left-handed threading such that turning the adjustment screw knob moves both connection jaw plates. The connection jaw plates include a contact geometry (i.e., large jaws with increased surface area) allowing for connection to flat or curved surfaces (i.e., non-flat surfaces).

Additional features and advantages will be set forth in the detailed description which follows, and, in part, will be readily apparent to those skilled in the art from the description or recognized by practicing the embodiments as described in the written description and claims hereof, as well as the appended drawings. It is to be understood that both the foregoing general description and the following detailed description are exemplary.

The accompanying drawings are included to provide further understanding and are incorporated in and constitute a part of this specification. The drawings illustrate one or more embodiments and, together with the description, serve to explain principles and operation of the various embodiments.

BRIEF DESCRIPTION OF THE DRAWINGS

This application will become more fully understood from the following detailed description, taken in conjunction with the accompanying figures, wherein like reference numerals refer to like elements in which:

FIG. 24 is a detailed perspective view of a clamping connection mechanism of the rotary laser level wall mount of FIG. 22, according to an exemplary embodiment.

DETAILED DESCRIPTION

Referring generally to the figures, various embodiments of a laser projection mount are shown. In general, the laser projection mount discussed herein is configured to support a laser level, such as a rotary laser level, and can be connected to a variety of surfaces and materials (e.g., walls, beams, metal studs etc.). As discussed herein, Applicant has developed a number of improvements to the functionality of a laser level mount. In contrast to the laser level mount discussed herein, other laser mounts frequently require a user to turn and/or tighten multiple screws in order to clamp or connect the mount to a surface. Applicant believes the mounting device described allows a user to more quickly clamp onto a surface and/or object by turning one screw knob while also providing for secure and stable support for a laser level. Therefore, a user can more efficiently complete a project requiring use of a laser in one or more mounted positions.

Further, Applicant believes the geometry of the clamps or connection jaw plates of the mount discussed herein allow for connection to a wide variety of surfaces, both flat (e.g., 2×4s, I-beams) and curved (e.g., pipes) while maintaining a high clamping force. The clamping connection mechanism design also allows for connection to materials with a range of widths providing an increased number of options for connecting the mounting device.

Figure 1:
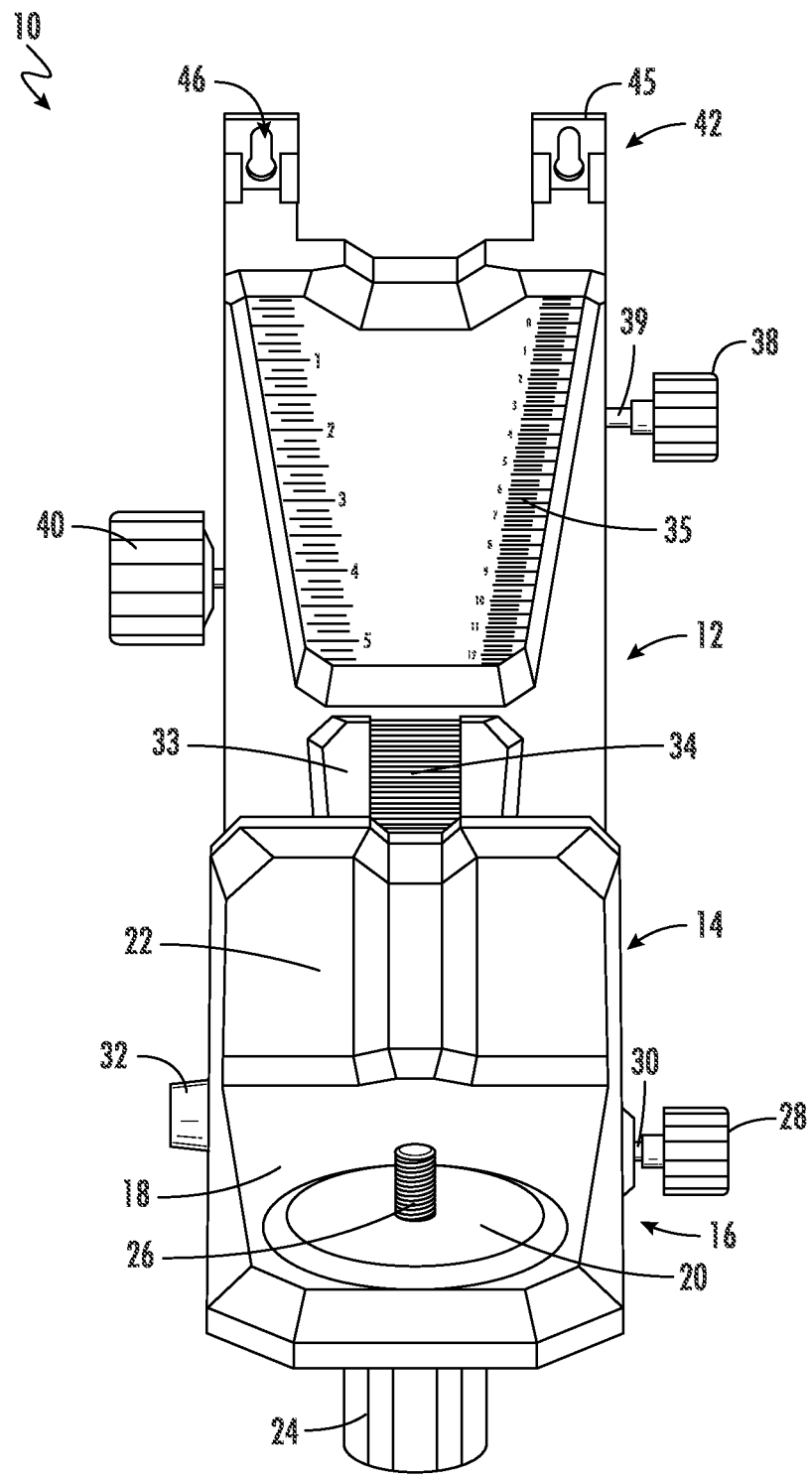
FIG. 1 is a front perspective view of a rotary laser level wall mount, according to an exemplary embodiment.
Figure 2:
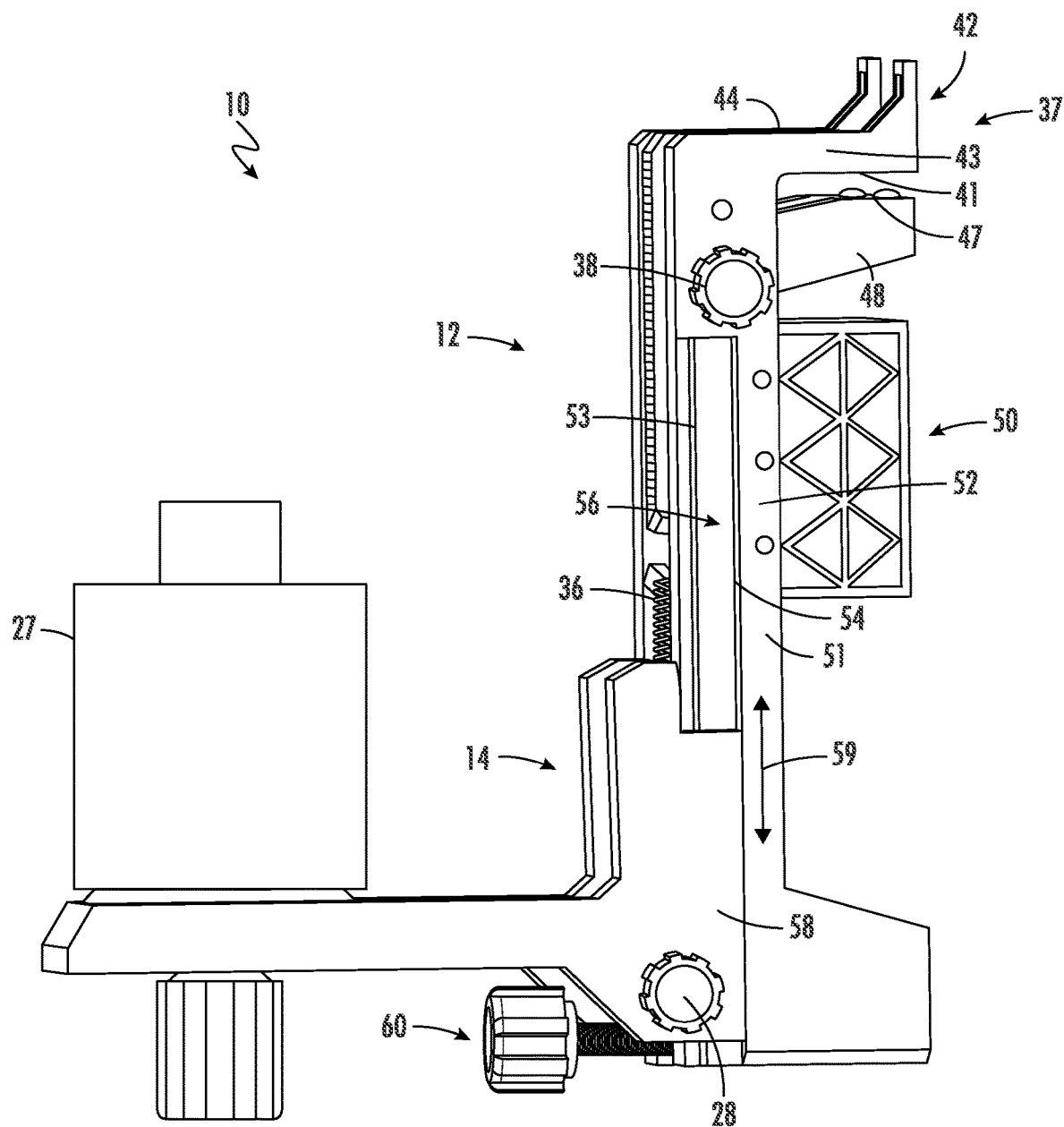
FIG. 2 is a left side perspective view of the rotary laser level wall mount of FIG. 1 with the laser platform in a first position according to an exemplary embodiment.

Referring to FIGS. 1-2, various aspects of a laser projection mount, shown as rotary laser level wall mount 10, are shown. Rotary laser level wall mount 10 includes a body 12, a laser platform 14, a clamping connection mechanism 50, an upper clamping mechanism 37 and an angle adjustment mechanism 60. Body 12 includes a front surface 33 that faces laser platform 14. Front surface 33 includes a plate 35 with a plurality of measurement markings and a track 34 positioned below plate 35. Track 34 includes a plurality of ridges 36. The laser platform 14 is adjustable and includes a generally horizontal portion 16 with an upward facing surface 18 and a generally vertical portion 22 extending in a perpendicular orientation from generally horizontal portion 16. In a specific embodiment, upward facing surface 18 includes a raised portion or stage 20. Laser platform 14 includes a screw knob 24 with a threaded connector 26 extending through generally horizontal portion 16.

Referring To FIG. 2, a left side perspective view of the rotary laser level wall mount is shown. As will be understood, threaded connector 26 engages a threaded mounting hole located along a bottom surface of a housing of a rotary laser device 27 shown schematically. Laser platform 14 further includes a pair of rear portions 57, 58 (see e.g., FIG. 4) positioned on either side of generally vertical portion 22 and extending in a rearward direction toward body 12. The left rear portion 58 includes a platform adjustment screw knob 28 coupled to a connection rod 30. Connection rod 30 couples and extends between rear portions 57, 58.

Figure 3:
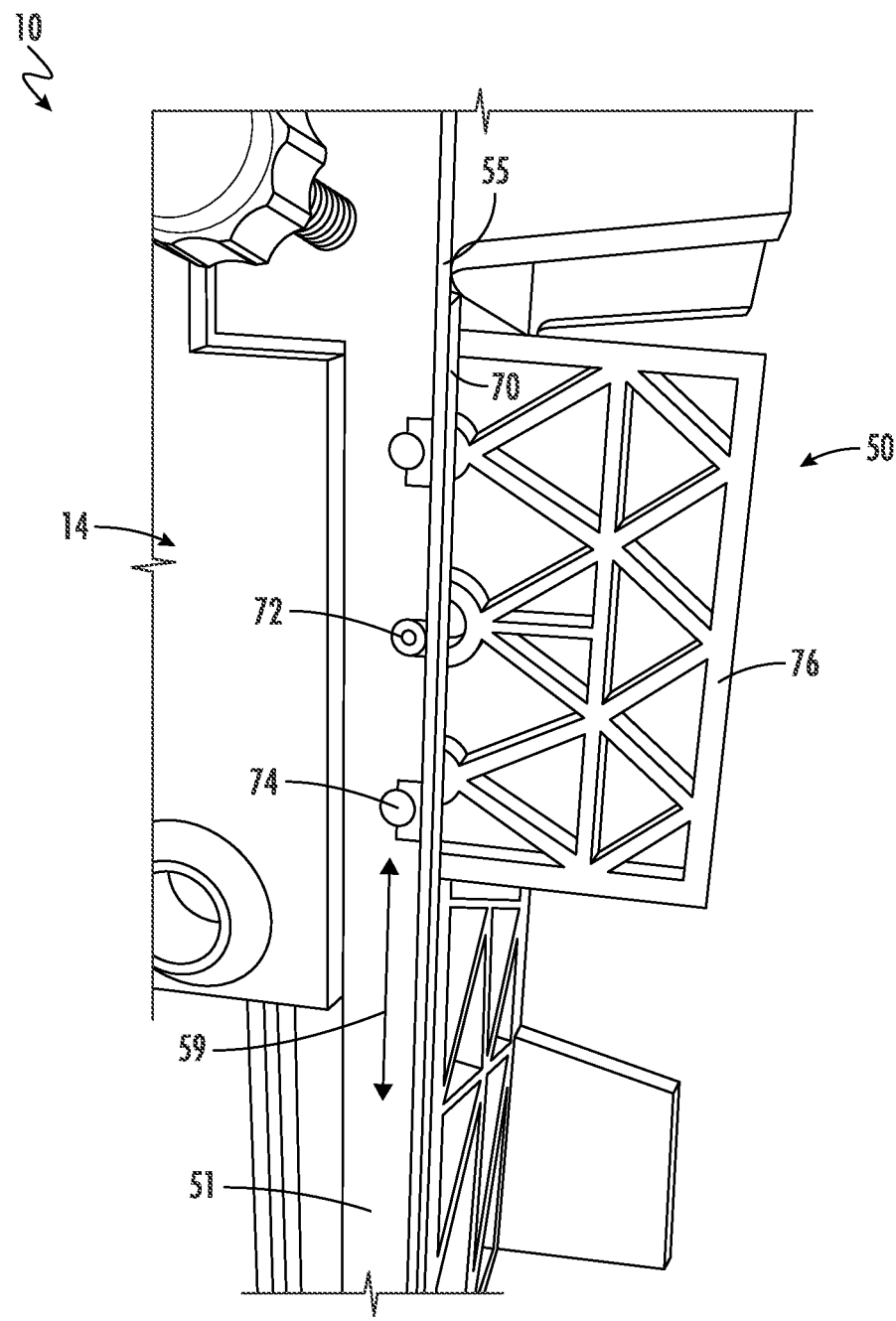
FIG. 3 is a detailed left side perspective view of the rotary laser level wall mount of FIG. 2 with the laser platform in a second position, according to an exemplary embodiment.

Referring to FIGS. 2-3, body 12 includes a pair of side walls 49, 51 extending away from front surface 33 in a generally perpendicular direction. Each side wall 49, 51 includes an outward facing surface 52 facing at least partially toward left rear portion 58 of laser platform 14. Outward facing surface 52 includes a first edge 53 and a second edge 54 that together define a longitudinally extending channel 56. Left rear portion 58 is configured to be received within channel 56. When a user rotates adjustment screw knob 28, laser platform 14 is adjustable in a direction as shown by arrow 59 along body 12. As adjustment screw knob 28 rotates, a connecting element coupled to connection rod 30 and having a surface including corresponding ridges engages with the plurality of ridges 36 of track 34. The longitudinal or vertical movement (i.e., along the length or major axis of the mount) of laser platform 14 shown from FIG. 2 to FIG. 3 demonstrates that laser platform 14 is not at a fixed position relative to body 12 or to the related clamping surface for laser level wall mount 10, allowing a user to reposition a laser without unclamping and repositioning the entire laser level wall mount 10.

Body 12 includes an upper clamping mechanism 37. Upper clamping mechanism 37 includes a pair of arms 43 extending rearward away from body 12 and away from front surface 33 in a generally perpendicular direction (i.e., 90 degrees±10 degrees). Each arm 43 includes a generally vertical projection 42 extending from a generally horizontal, upward facing surface 44. Generally vertical projection 42 includes a front surface 45. Front surface 45 includes a bore 46 configured to receive an attachment device (e.g., a fastener, hook, screw, nail, etc.). Each arm 43 further includes a lower surface 41. Lower surface 41 is generally horizontal and is position in a parallel orientation to generally horizontal, upward facing surface 44.

Upper clamping mechanism 37 further includes a pair of rearward extending projections 48 positioned below arms 43 and between a right side wall 49 and a left side wall 51 of body 12. Rearward extending projections 48 each include an upper surface 47 facing lower surface 41 of arms 43. Arms 43 together with rearward extending projections 48 act as a clamping structure where lower surfaces 41 and upper surfaces 47 can be used to clamp or grasp a surface or object such as a ceiling grid track. Left side wall 51 further includes an upper screw knob 38 coupled to a threaded connector 39. Upper screw knob 38 and threaded connector 39 are used to actuate arms 43 and rearward extending projections 48. In a specific embodiment, threaded connector 39 is a hex bolt receiving within upper screw knob 38 and extending through outward facing surface 52.

When a user turns upper screw knob 38 in a first direction, arms 43 are in a first position and spaced a first distance from rearward extending projections 48. When a user turns upper screw knob in a second direction, arms 43 are in a second position and spaced a second distance from rearward extending projections 48. In a specific embodiment, the second distance between arms 43 and rearward extending projections 48 is less than the first distance. As will be described in greater detail below, upper screw knob 38 actuates upper clamping mechanism 37. In a specific embodiment, upper screw knob 38 and threaded connector 39 are engaged with a ball detent 132 that pushes an angled internal wall 134 (See e.g., FIG. 14) as the threaded connector 39 is advanced.

Referring to FIG. 3, a detailed view of the left side of laser level wall mount 10 is shown. FIG. 3 shows a detailed view of the connection between body 12 and clamping connection mechanism 50. In general, clamping connection mechanism 50 includes a pair of connection jaw plates 76 that are moveable toward each other to clamp on to both generally vertically oriented surfaces and generally horizontally oriented surfaces or structures. Clamping connection mechanism 50 includes a retention plate 70, a threaded rod 72, a pair of guide rods 74, a pair of connection jaw plates or clamps 76 and a clamp adjustment screw knob 40 (see e.g. FIGS. 1 and 4). Left side wall 51 includes a rear edge 55 adjacent to at least a portion of retention plate 70.

Figure 4:
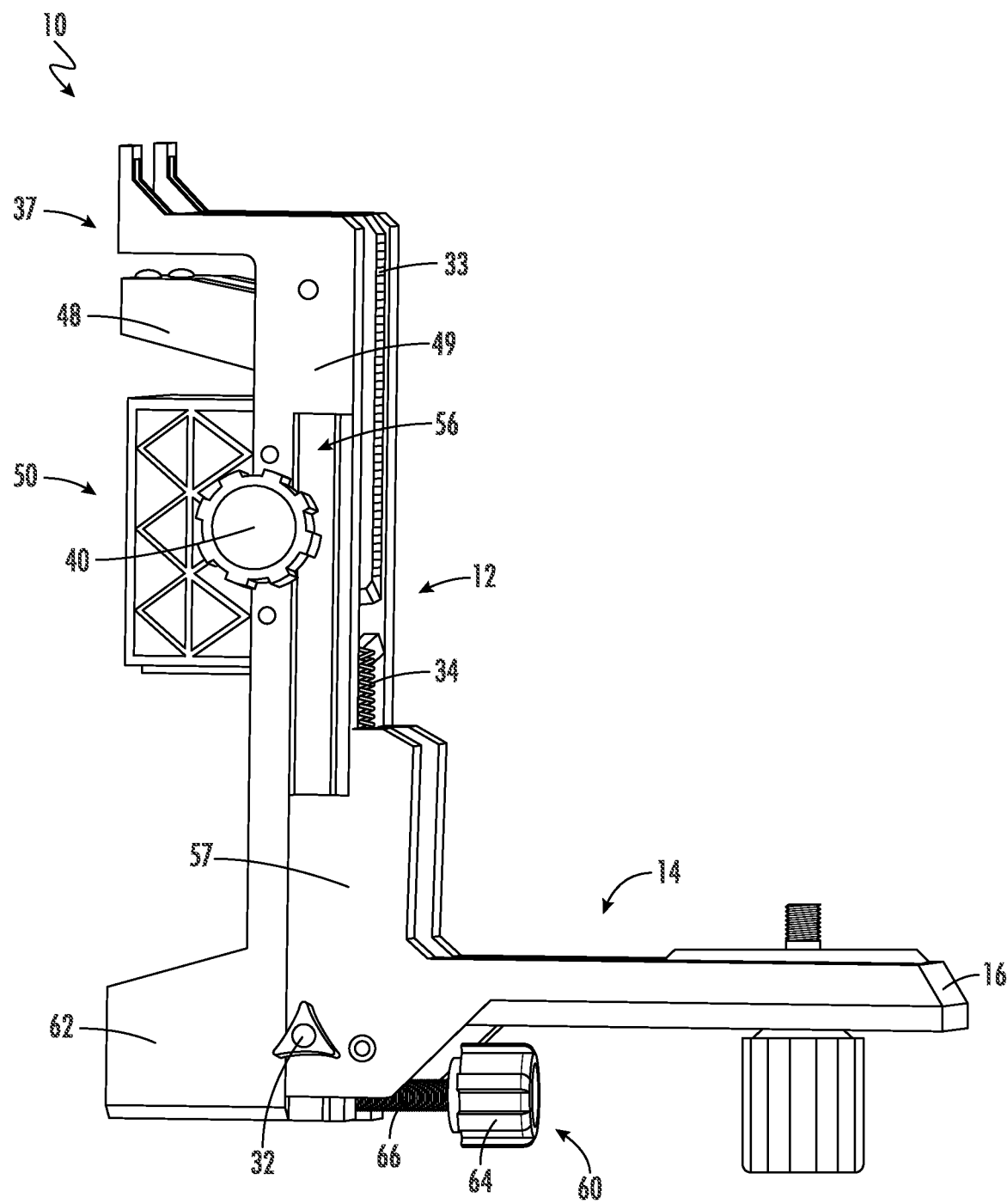
FIG. 4 is a right side perspective view of the rotary laser level wall mount of FIG. 1, according to an exemplary embodiment.

Referring to FIG. 4, right rear portion 57 of laser platform 14 is configured to be received within channel 56. Right rear portion 57 includes a knob 32. In a specific embodiment, knob 32 is coupled to a threaded connector such as a hex bolt configured to engage with channel 56 and fix and/or lock laser platform 14 in position relative to channel 56 and body 12. Right side wall 49 includes clamp adjustment screw knob 40 positioned on outward facing surface 52 behind channel 56. Clamp adjustment screw knob 40 is coupled to threaded rod 72.

Body 12 further includes a pair of feet 62 extending in away from body 12 and laser platform 14. An angle adjustment mechanism 60 is positioned below generally horizontal portion 16 of laser platform 14. Angle adjustment mechanism 60 includes a screw knob or angle adjustment knob 64 and a threaded connector 66 extending through front surface 33 and/or body 12. In a specific embodiment, threaded connector 66 is a hex bolt. As will be described in greater detail below, when a user turns screw knob 64 in a tightening direction, the angle of laser level wall mount 10 relative to the object and/or surface wall mount 10 is clamped to is adjusted.

Figure 5:
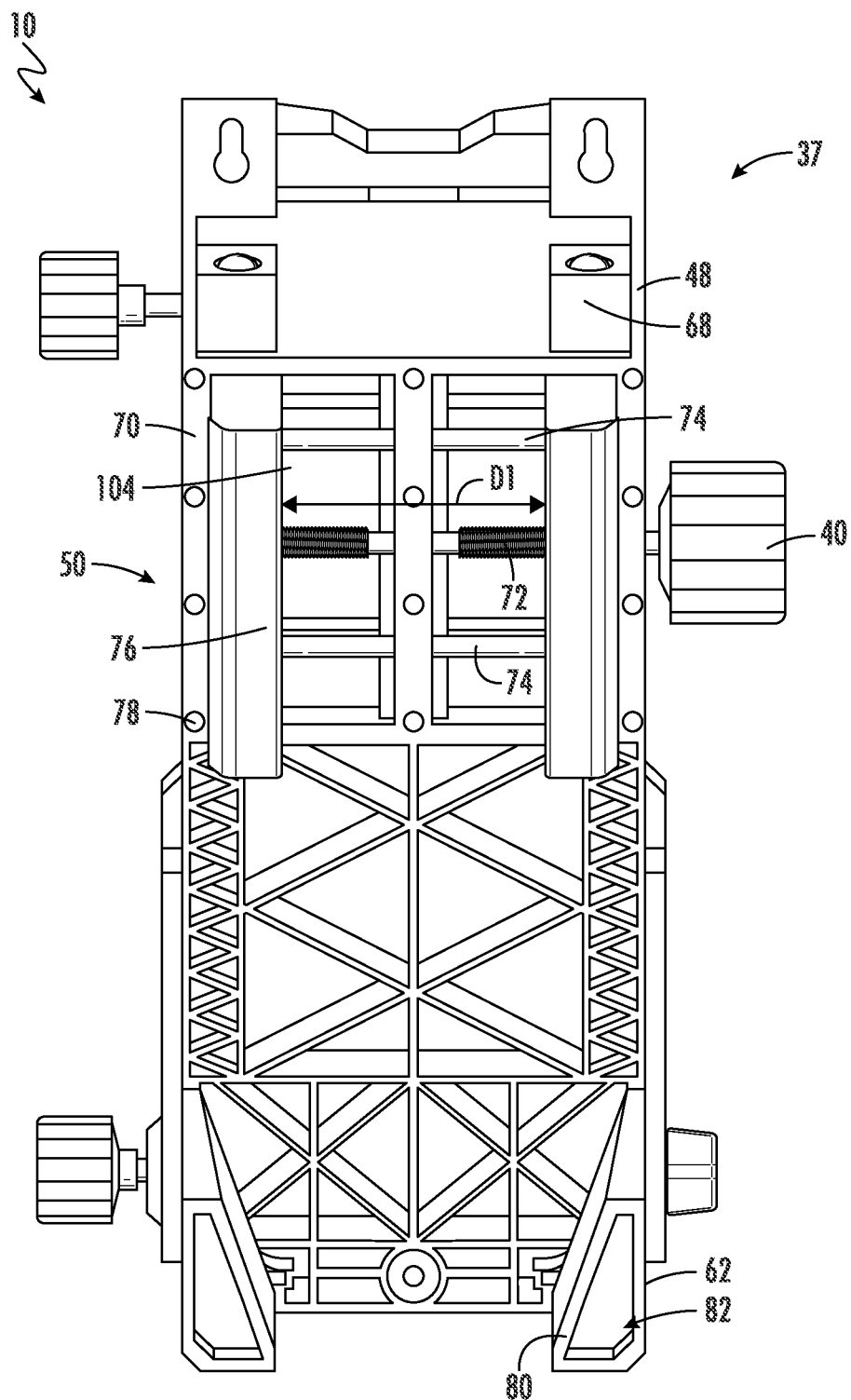
FIG. 5 is a rear perspective view of the rotary laser level wall mount of FIG. 1, according to an exemplary embodiment.
Figure 6:
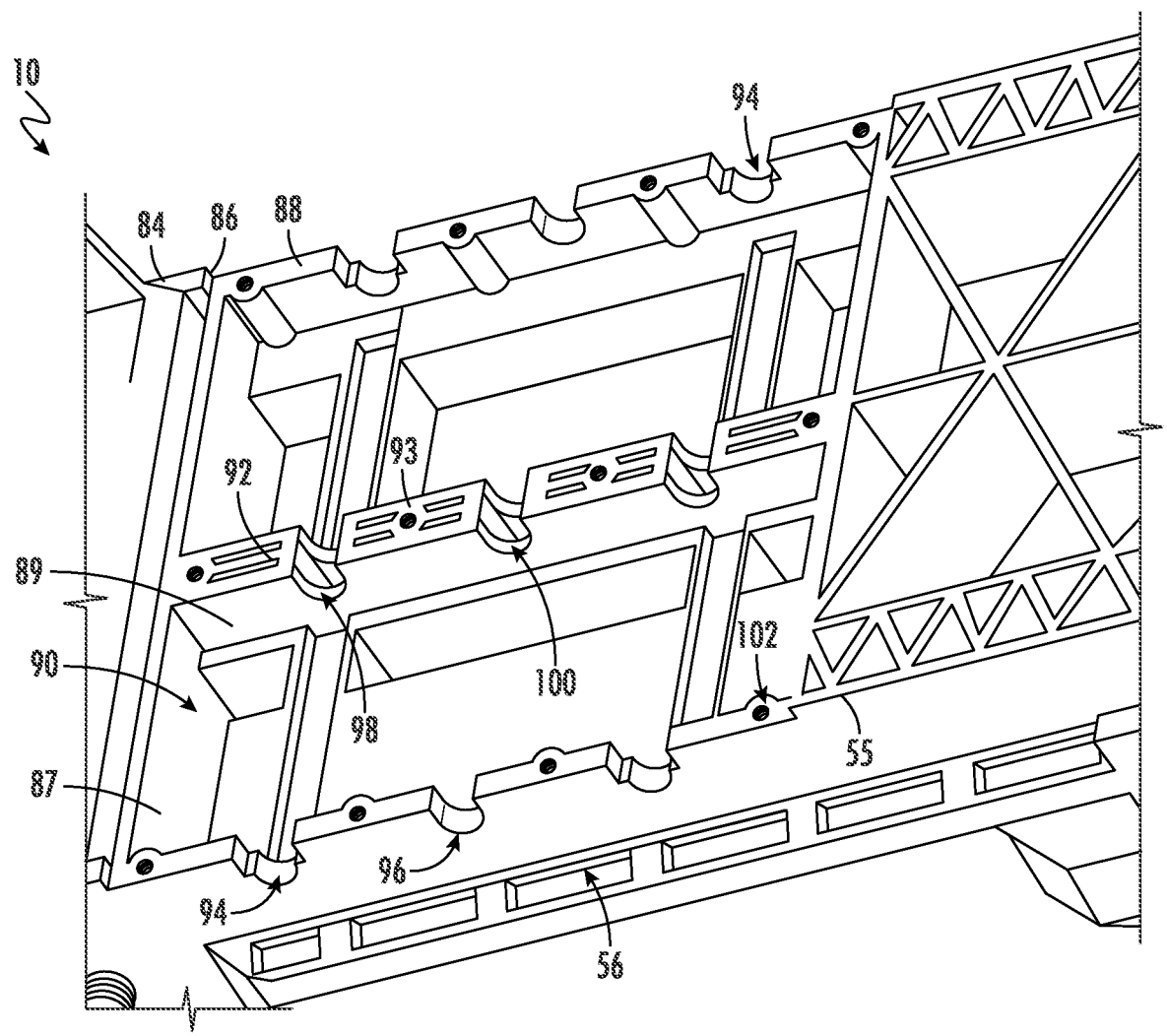
FIG. 6 is a detailed view of the rear surface of the rotary laser level wall mount of FIG. 1, according to an exemplary embodiment.
Figure 7:
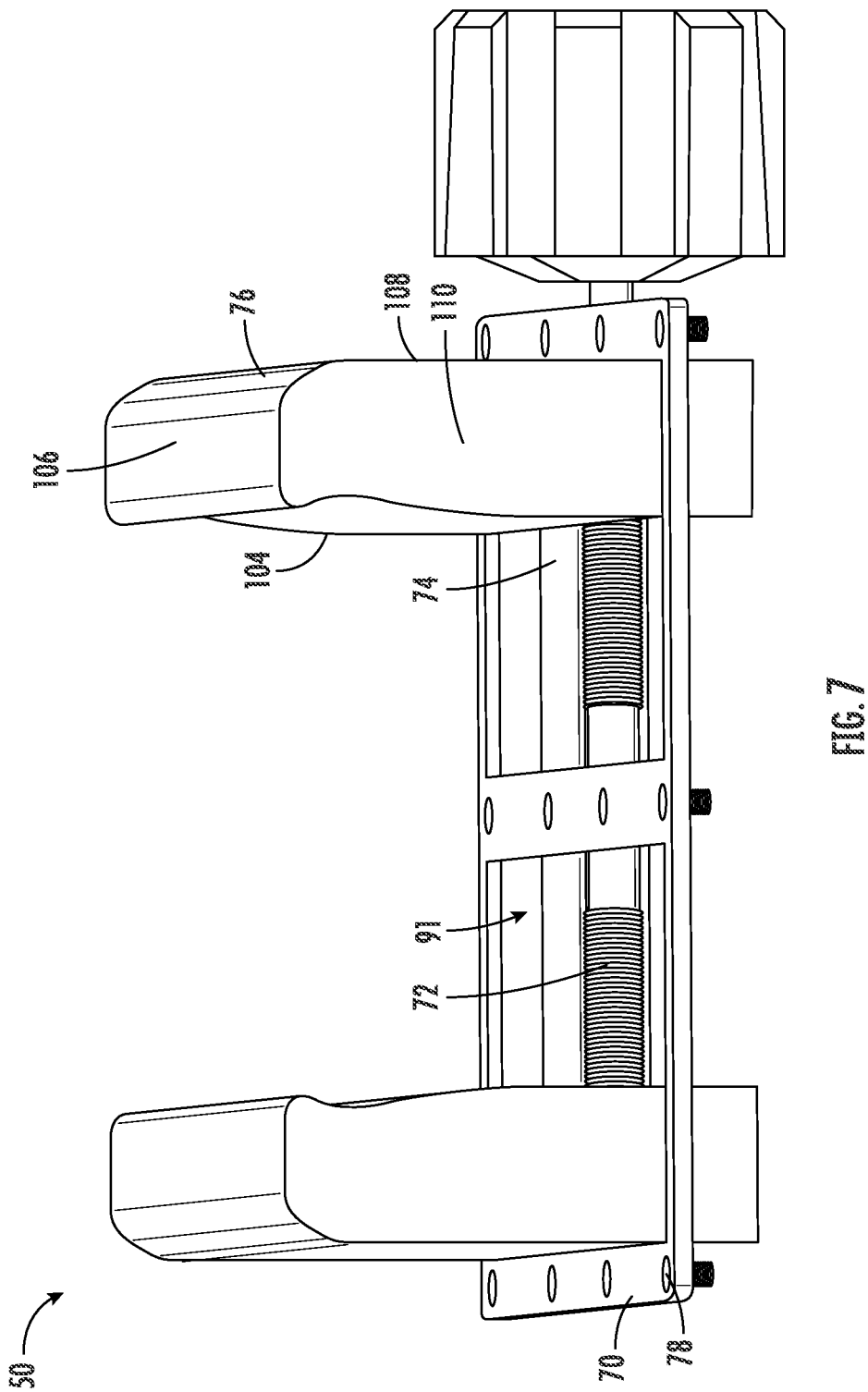
FIG. 7 is a detailed perspective view of a clamping connection mechanism of the rotary laser level wall mount of FIG. 1, according to an exemplary embodiment.

Referring to FIGS. 5-7, the rear portion of body 12 and the connection between body 12 and clamping connection mechanism 50 is shown. Rearward extending projections 48 include rear surfaces 68. Rear surfaces 68 may engage with the surfaces and/or workpiece that laser level wall mount 10 is coupled to and may act to further stabilize laser level wall mount 10. Similarly, feet 62 include rear surfaces 80 that define a bore 82.

Connection jaw plates or clamps 76 each include an inward facing surface 104 that opposes the inward facing surface 104 of the opposing connection jaw plate 76. When a user turns clamp adjustment screw knob 40 the distance between the connection jaw plate 76 shown as D1 is changed. Threaded rod 72 includes both right-handed and left-handed threading allowing adjustment screw knob 40 to move both connection jaw plates 76 at once. In a specific embodiment D1 is adjustable at least between 0.5 inches and 3 inches such that connection can be made to surfaces and/or materials with a variety of widths.

Body 12 includes a pair of recesses 90. Recesses 90 are defined by a pair of axially extending inner surfaces 87 and a pair of longitudinally extending inner surfaces 89 connecting the pair of axially extending inner surfaces 87. The longitudinally extending inner surfaces 89 positioned centrally, furthest from rear edge 55 are located on a central wall 92 that divides the pair of recesses 90. Both right side wall 49 and left side wall 51 include a rear surface 84 facing an opposite direction from front surface 33. Central wall 92 includes an upper surface 93 positioned in a parallel orientation to rear surface 84.

Rear surface 84 extends and continues into a generally vertical surface 86 which is perpendicular to rear surface 84. Generally vertical surface 86 continues into a generally horizontal surface 88. Generally horizontal surface 88 is parallel to rear surface 84 and perpendicular to generally vertical surface 86. Generally horizontal surface 88 includes a first pair of channels 94 having a first geometry and configured to receive at least a portion of guide rods 74. Generally horizontal surface 88 further includes a second channel positioned between the first pair of channels and having a second geometry configured to receive threaded rod 72. In a specific embodiment, the second geometry of the second channel is different from the first geometry of the first channels.

Upper surface 93 of central wall 92 includes a third pair of channels 98 having a third geometry and configured to receive at least a portion of guide rods 74. The third pair of channels 98 are aligned with the first pair of channels 94 positioned on right side wall 49 and left side wall 51. Upper surface 93 further includes a fourth channel 100 positioned between the third pair of channels 98 and having the second geometry to receive threaded rod 72. In a specific embodiment, the third geometry is different from the first and second geometries.

Figure 8:
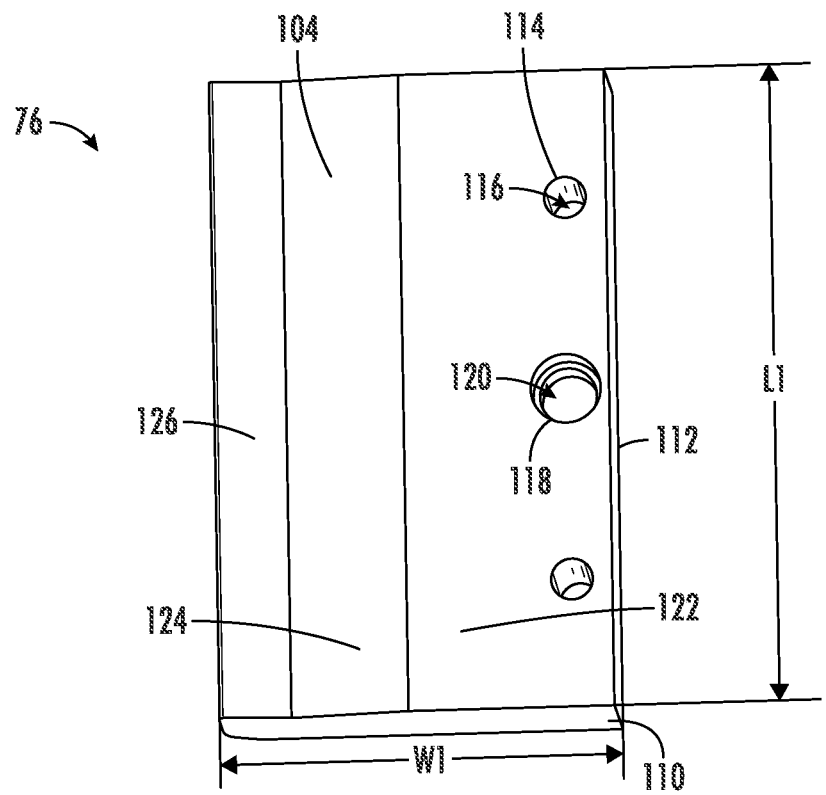
FIG. 8 is a detailed perspective view of a connection jaw plate of the rotary laser level wall mount of FIG. 1, according to an exemplary embodiment.
Figure 9:
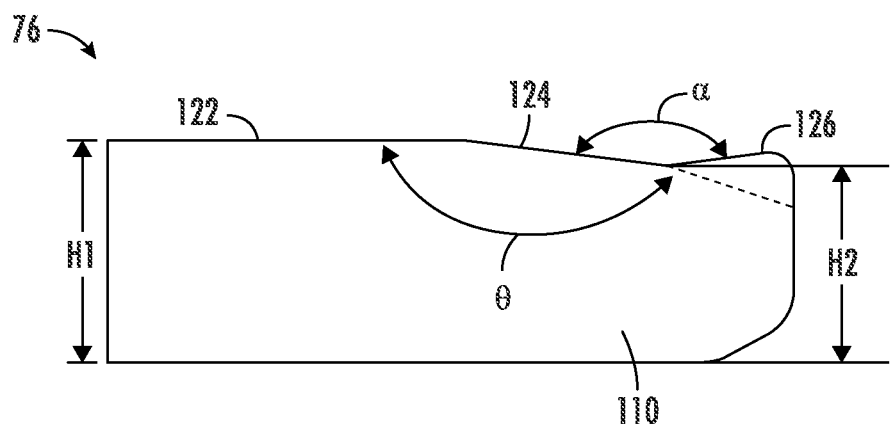
FIG. 9 is plan view of the connection jaw of FIG. 8, according to an exemplary embodiment.
Figure 10:
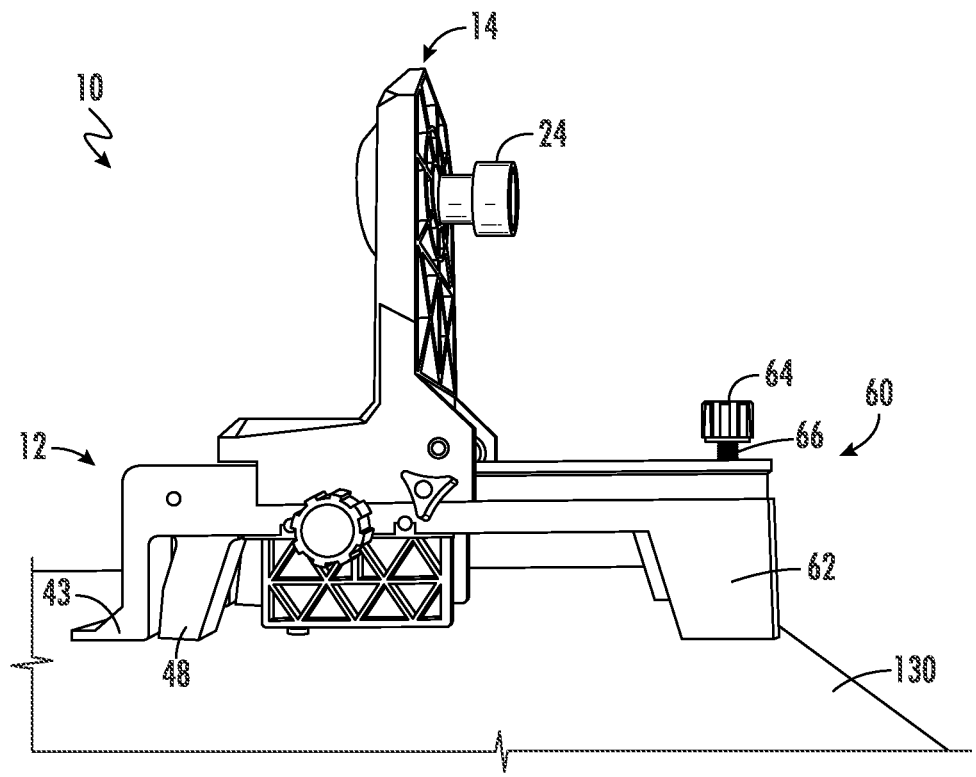
FIG. 10 is right side perspective view of the rotary laser level wall mount of FIG. 1 with the angle adjustment mechanism in a first position, according to an exemplary embodiment.
Figure 11:
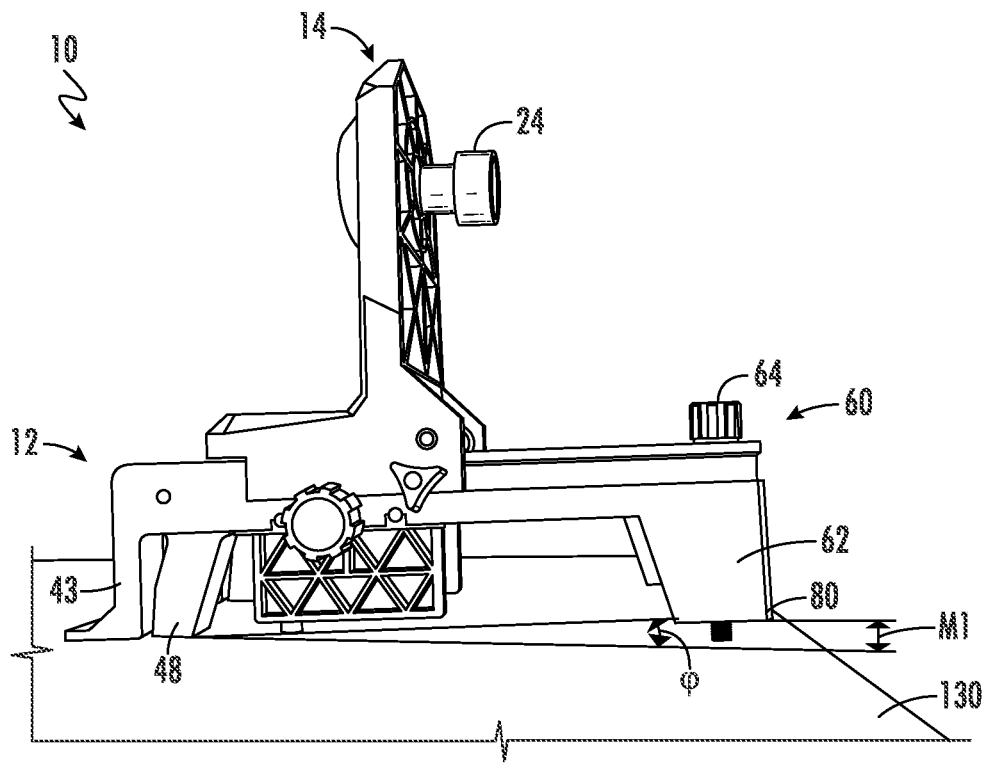
FIG. 11 is a right side perspective view of the rotary laser level wall mount of FIG. 10 with the angle adjustment mechanism in a second position, according to an exemplary embodiment.
Figure 12:
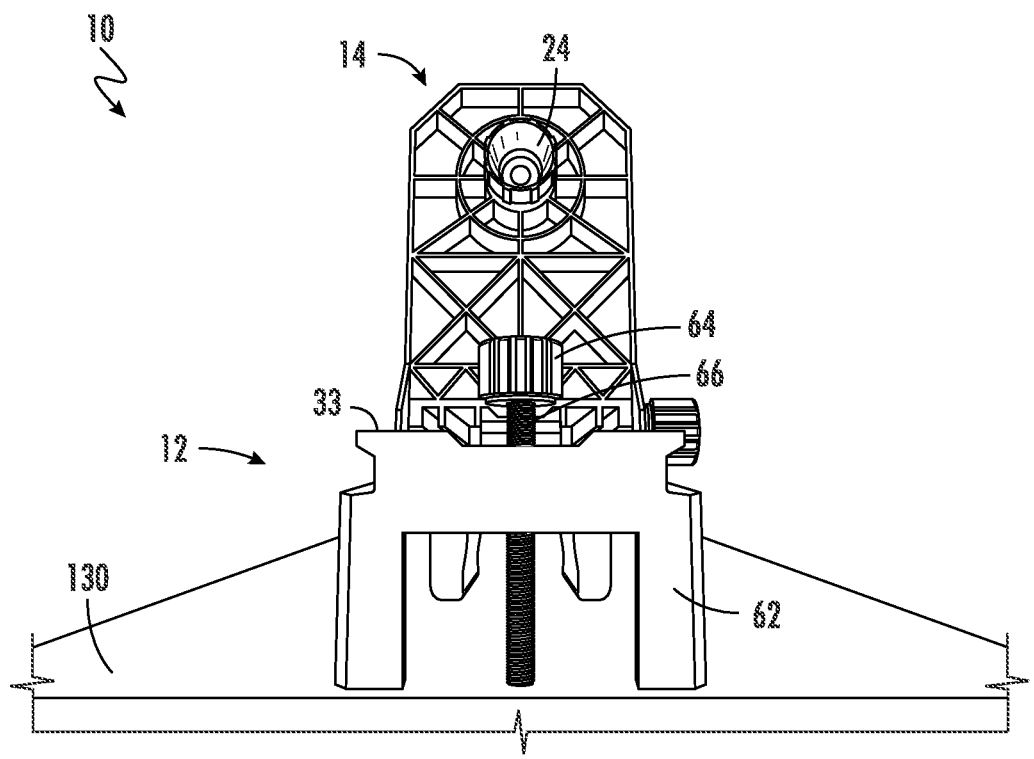
FIG. 12 is a bottom perspective view of the rotary laser level wall mount of FIG. 1 with the angle adjustment mechanism in a first position, according to an exemplary embodiment.
Figure 13:
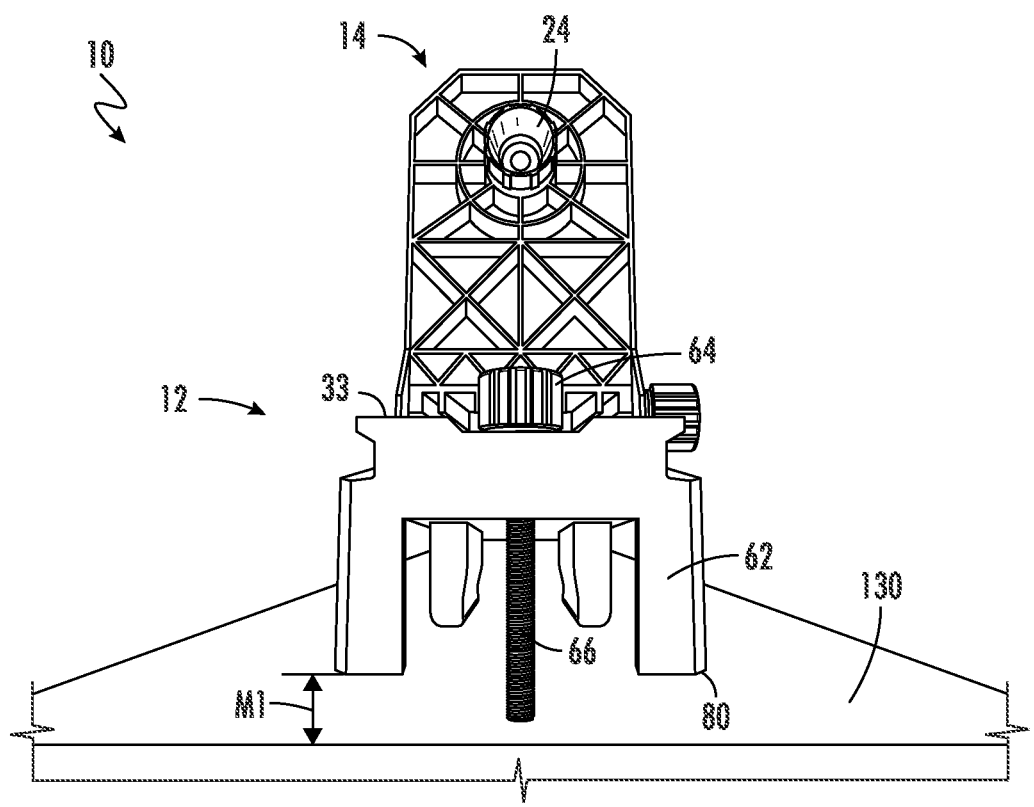
FIG. 13 is a bottom perspective view of the rotary laser level wall mount of FIG. 12 with the angle adjustment mechanism in a second position, according to an exemplary embodiment.

Referring to FIGS. 7-9, detailed views of clamping connection mechanism 50 are shown. Retention plate 70 compresses guide rods 74 and threaded rod 72 into place to prevent misalignment of clamping connection mechanism 50. Guide rods 74 prevent binding between connection jaw plates 76 and the body 12 of laser level wall mount 10. Retention plate 70 is coupled to body 12 by a plurality of fasteners 78, shown as screws received within bores 102. Retention plate 70 includes a pair of apertures 91 that correspond to recesses 90. Connection jaw plates 76 are positioned within apertures 91 and at least a portion of connection jaw plates 76 are received within the recesses 90. Each connection jaw plate 76 includes inward facing surface 104, rear facing surface 106, outward facing surface 108, bottom surface 112 and a pair of side surfaces 110. One of the side surfaces 110 is upward facing towards rearward extending projection 48 while the opposing side surface 110 is downward facing toward feet 62.

Inward facing surface 104 includes a horizontal portion 122, a first angled portion 124 and a second angled portion 126. First angled portion 124 is positioned between horizontal portion 122 and second angled portion 126. Horizontal portion 122 of inward facing surface 104 includes a pair of edges 114 defining a first pair of bores 116. Bores 116 extend between inward facing surface 104 outward facing surface 108 and is sized to receive guide rods 74. Horizontal portion 122 further includes an edge 118 defining a bore 120 positioned between the pair of bores 116. Bore 120 extends between inward facing surface 104 outward facing surface 108 and is sized to receive a threaded insert for connection to threaded rod 72.

Referring to FIGS. 8-9, details of connection jaw plate or clamp 76 sizes and geometries that can be utilized with laser level wall mount 10 are shown, according to an exemplary embodiment. Applicant believes the geometry of the connection jaw plates described allows for connection to either flat or curved surfaces without causing a reduction in clamping force.

A distance between the opposing side surfaces 110 defines a length of connection jaw plate 76, shown as L1. The distance between rear facing surface 106 and bottom surface 112 defines a width of clamp 76, shown as W1. In a specific embodiment, W1 is specifically between 50% and 70% of L1, and more specifically between 55% and 65% of L1. In a specific embodiment, W1 is between 60% and 63% of L1 and in such embodiments W1 is about 2.4 inches (e.g. 2.4 inches plus or minus 0.05 inches).

The distance between horizontal portion 122 of inward facing surface 104 and outward facing surface 108 defines a first height of connection jaw plate 76, shown as H1. A distance between inward facing surface 104 and outward facing surface 108 at the point first angled portion 124 and second angled portion 126 meet defines a second height of connection jaw plate 76, shown as H2. In a specific embodiment, H1 is specifically between 10% and 30% of L1, and more specifically between 15% and 25% of L1. In a specific embodiment, H1 is between 18% and 22% of L1 and in such embodiments H1 is about 0.787 inches (e.g. 0.787 inches plus or minus 0.005 inches). In a specific embodiment, H2 is specifically between 79% and 99% of H1, and more specifically between 85% and 95% of H1. In a specific embodiment, H2 is between 87% and 90% of H1 and in such embodiments H2 is about 0.696 inches (e.g. 0.696 inches plus or minus 0.005 inches).

An angle between first angled portion 124 and second angled portion 126 of connection jaw plate 76 is defined as an angle α. In a specific embodiment, α is between 160° and 170° and in such an embodiment α is about 165.5° (e.g., 165.5° plus or minus 2°). The internal angle between horizontal portion 122 of inward facing surface 104 and first angled portion 124 of connection jaw plate 76 is defined as an angle θ. In a specific embodiment, θ is between 165° and 175° and in such an embodiment θ is about 172.7° (e.g., 172.7° plus or minus) 2°.

Referring to FIGS. 10-13, details of angle adjustment mechanism 60 are shown. When a user turns screw knob 64 in a tightening direction threaded connector 66 pushes against the surface or object rotary laser level wall mount 10 is attached to changing the angle of mount 10 relative to the surface or object laser level wall mount 10 is attached to. Angle adjustment mechanism 60 allows for use of rotary laser level wall mount 10 on an uneven surface that would otherwise position rotary laser level mount 10 and/or rotary laser device 27 at an undesirable angle. Screw knob 64 is coupled to an end of threaded connector 66. As screw knob 64 is tightened, threaded connector 66 extends further through front surface 33 of body 12 pushing away from a surface or wall, shown as surface 130 that arms 43, rearward extending projections 48 and feet 62 are positioned against. When a user turns angle adjustment screw knob 64 the distance between surface 130 and rear surfaces 80 of feet 62 shown as M1 is changed (i.e., increased). In a specific embodiment M1 is adjustable up to about 1.3 inches (e.g., 1.3 inches plus or minus 0.1 inches). As M1 is increased, an angle between rear surface 80 of a foot 62 and surface 130 is defined as an angle φ. In a specific embodiment, φ is about 6° (e.g., 6° plus or minus 1°).

Figure 14:
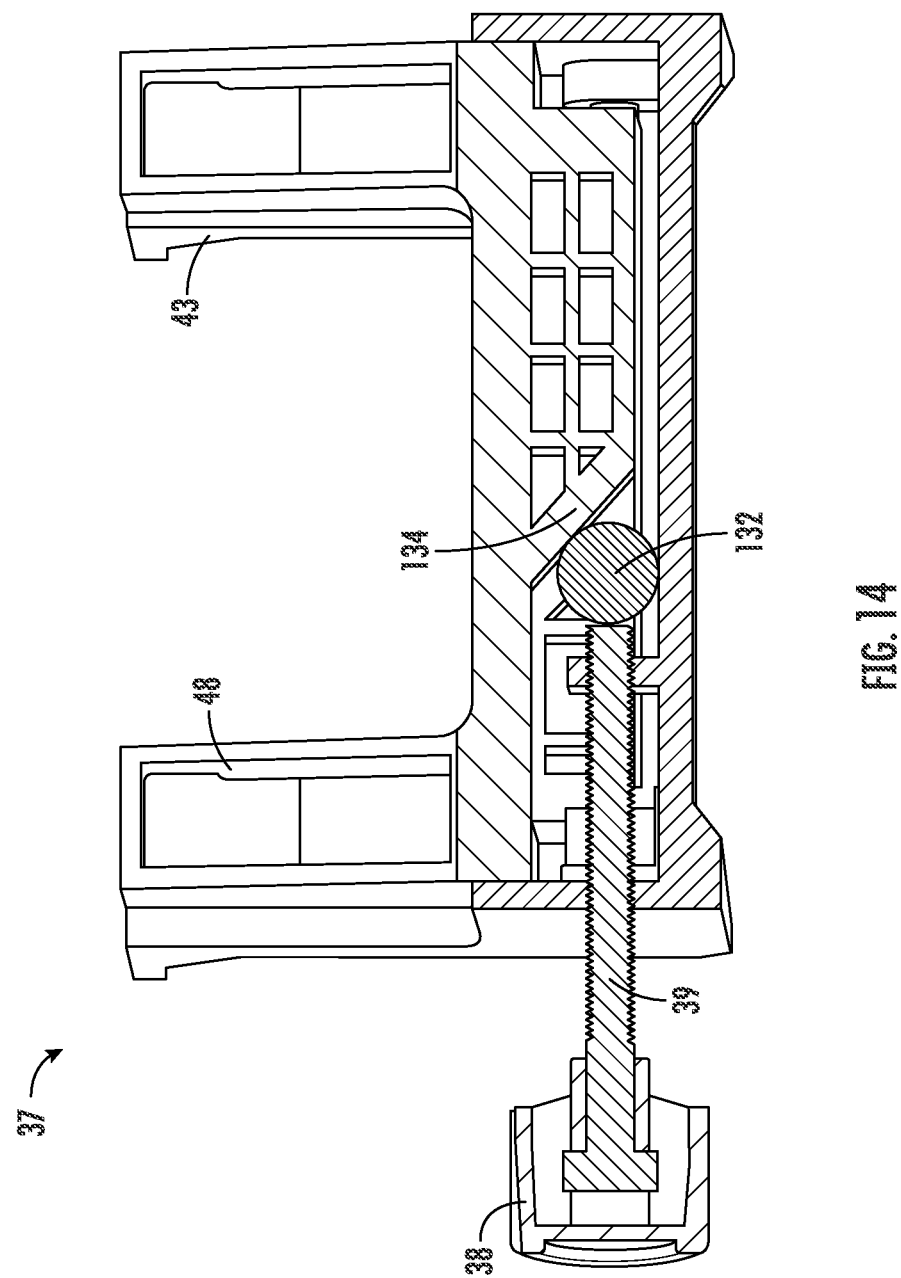
FIG. 14 is a cross-sectional, bottom perspective view of a portion of the upper clamping mechanism of the rotary laser level wall mount of FIG. 1, according to an exemplary embodiment.

Referring to FIG. 14, details of upper clamping mechanism 37 are shown. When a user turns upper screw knob 38 threaded connector 39 engages with a ball 132 that is wedged into angled internal wall 134. In a specific embodiment, ball 132 is formed from steel. In another embodiment ball 132 may be formed from a different material (e.g., aluminum, plastic, etc.). As a user continues to tighten upper screw knob 38, a distance between arms 43 and rearward extending projections 48 is decreased.

Figure 15:
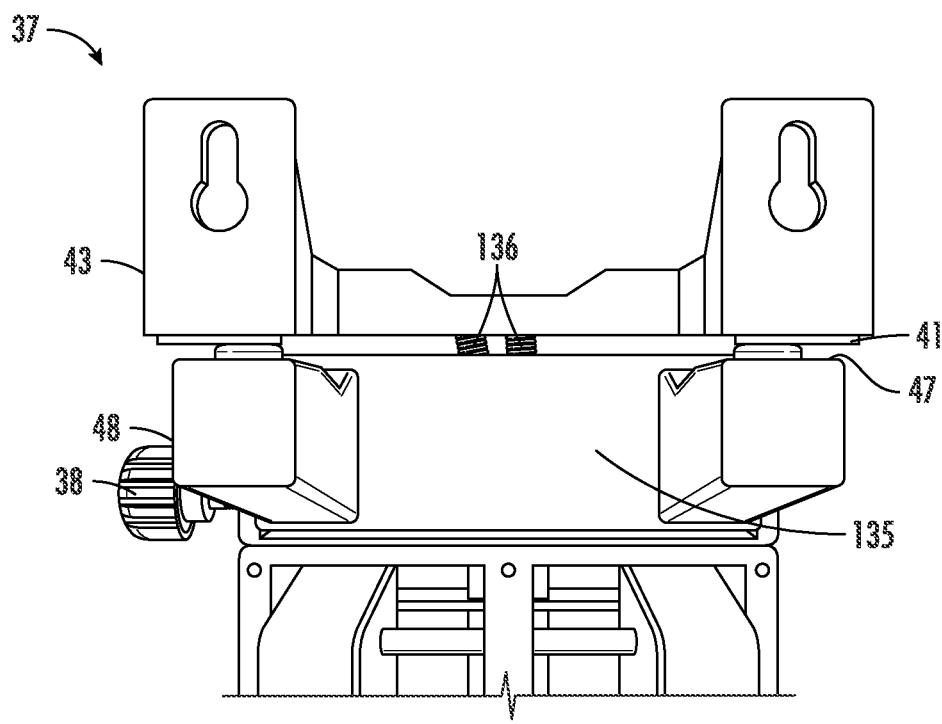
FIG. 15 is a detailed rear perspective view of the rotary laser level wall mount of FIG. 1 with the upper clamping mechanism in a first position, according to an exemplary embodiment.
Figure 16:
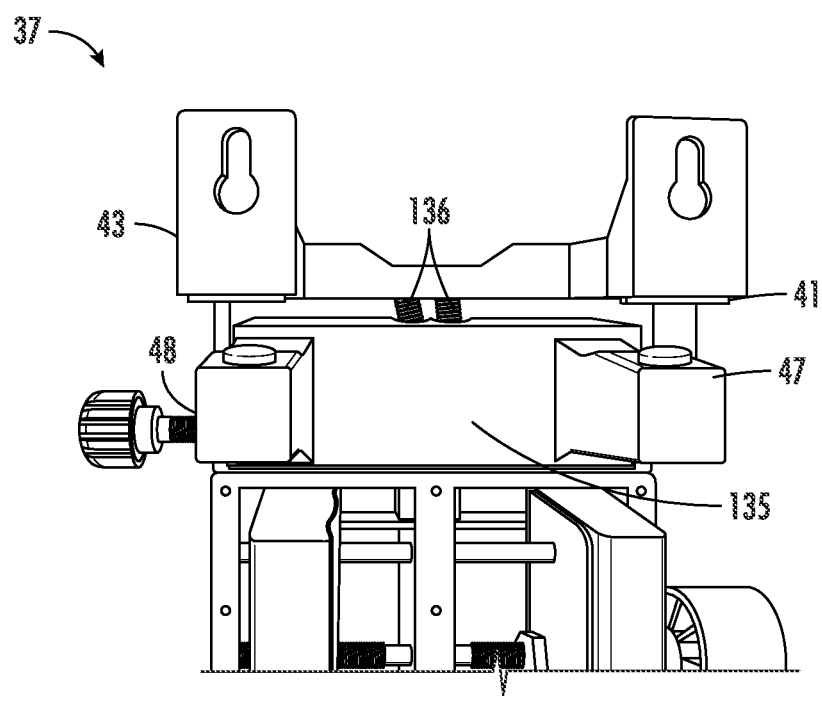
FIG. 16 is a detailed rear perspective view of the rotary laser level wall mount of FIG. 1 with the upper clamping mechanism in a second position, according to an exemplary embodiment.

Referring to FIGS. 15-16, upper clamping mechanism 37 further includes a body 135 extending between and connecting rearward extending projections 48. A pair of springs 136 are positioned within body 135 and extend between lower surface 41 of arms 43 and upper surface 47 of rearward extending projections 48. When a user loosens upper screw knob 38, the distance between arms 43 and rearward extending projections 48 is increased as springs 136 push upper clamping mechanism 37 into an open position.

Referring to FIGS. 17-21, another embodiment of the clamping connection mechanism, shown as clamping connection mechanism 250, that can be utilized with a laser level wall mount such as laser level wall mount 10 are shown. In general, clamping connection mechanism 250 is substantially the same as clamping connection mechanism 50 except for the differences discussed herein. As will be discussed in greater detail below, instead of using a pair of guide rods, molded projections on the body of the mount can be used. Applicant believes this not only reduces manufacturing costs (i.e., fewer parts and easier assembly), but also increases the durability of the mount. Applicant believes a more secure attachment of clamping connection mechanism can be achieved using surface projections, such as molded surface projections (i.e., more difficult for a user to pull the connection jaw plates off the body with molded projections compared to guide rods held in place by fasteners).

Figure 17:
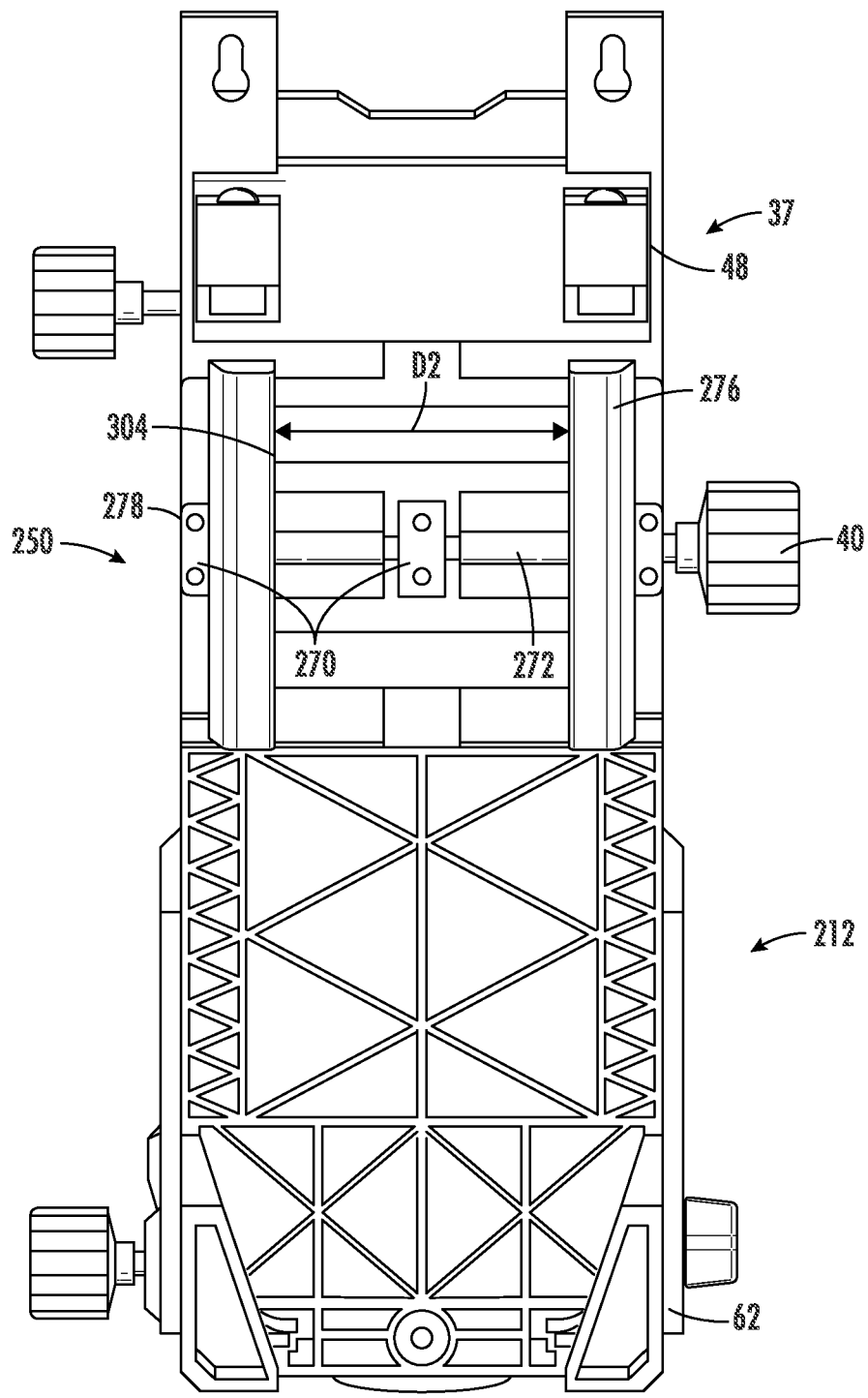
FIG. 17 is a rear perspective view of the rotary laser level wall mount of FIG. 1, according to another exemplary embodiment.
Figure 18:
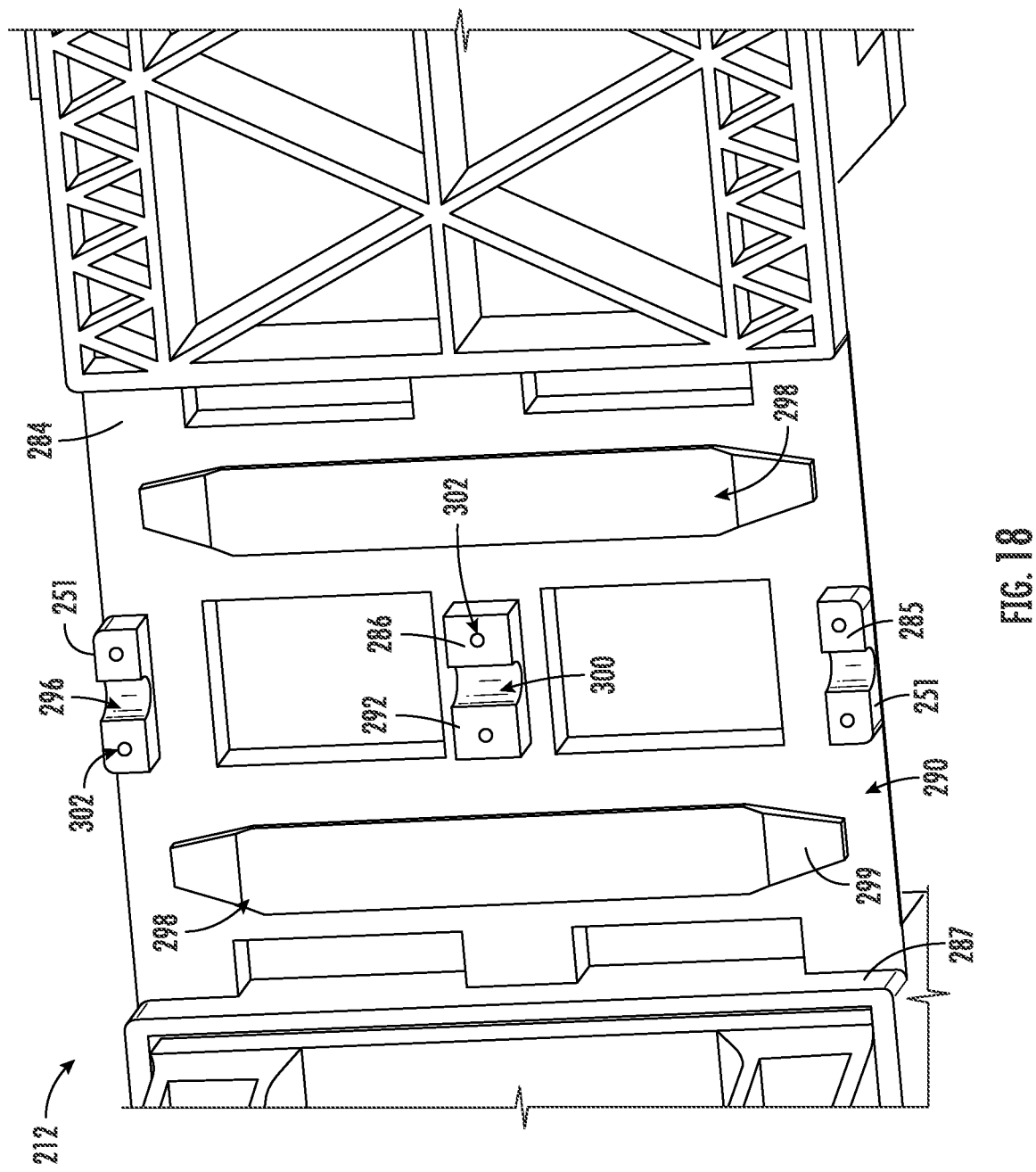
FIG. 18 is a detailed view of the rear surface of the rotary laser level wall mount of FIG. 17, according to an exemplary embodiment.

Referring to FIGS. 17-18, the rear portion of a body 212 and the connection between body 212 and clamping connection mechanism 250 is shown. Connection jaw plates or clamps 276 each include an inward facing surface 304 that opposes the inward facing surface 304 of the opposing connection jaw plate 276. When a user turns clamp adjustment screw knob 40 the distance between the connection jaw plates 276, and specifically inward facing surfaces 304 shown as D2 is changed. When the user turns clamp adjustment screw knob 40 until the distance is a clamping distance (i.e., desired distance to clamp onto a surface or object), the connection jaw plates 276 are configured to engage a flat surface or a curved surface such that the mount 10 is supported from the flat or curved surface. Adjustment rod 272 extends between and couples the pair of connection jaw plates 276 together allowing for clamp adjustment screw knob 40 to move both connection jaw plates 276 at once. Screw knob 40 is coupled to an end of adjustment rod 272. For example, adjustment rod 272 can include includes both right-handed and left-handed threading to allow for movement of both connection jaw plates 276. In a specific embodiment D2 is adjustable at least between 0.5 inches and 3 inches such that connection can be made to surfaces and/or materials with a variety of widths.

Body 212 includes an open recess portion 290. A rear surface 284 of body 212 extends across at least of portion of open recess portion 290. Connection jaw plates 276 extend outward from the rear surface 284 of the body 212. Recess portion 290 is defined at least partially by a pair of axially extending opposing inner surfaces 287. Body 212 does not include longitudinally extending walls to connect the pair of axially extending inner surfaces 287. A pair of side walls 251 are coupled to rear surface 284 and positioned within open recess portion 290 between the pair of axially extending inner surfaces 287 such that side walls 251 extend in a perpendicular direction relative to inner surfaces 287. Side walls 251 each include a generally horizontal surface 285 that is parallel to rear surface 284. Each generally horizontal surface 285 includes a first channel 296 having a first geometry and configured to receive at least a portion of adjustment rod 272.

A central wall 292 is positioned in a parallel orientation to side walls 251 within the open recess portion 290 and in between the opposing side walls 251. Central wall 292 includes a generally horizontal surface 286 that is parallel to rear surface 284. Generally horizontal surface 286 includes a second channel 300 having a second geometry and configured to receive at least a portion of adjustment rod 272. In a specific embodiment, the second geometry of the second channel is different from the first geometry of the first channels. A plurality of retention plates 270 are coupled to body 212 and specifically to side walls 251 and central wall 292 by a plurality of fasteners 278 (e.g., screws, bolts, etc.), shown schematically. Fasteners 278 are received within bores 302.

One or more projections, shown as dovetail projections 298 are coupled to rear surface 284 of body 212 within open recess portion 290. In a specific embodiment, dovetail projections are molded onto rear surface 284. In other embodiments dovetail projections may be coupled to body 212 using another method (e.g., mechanical fastening, adhesive, etc.). In the illustrated embodiment, two dovetail projections 298 are coupled to rear surface 284. In other embodiments a different number of dovetail projections may be used (e.g., 1, 3, 4, etc.). Each dovetail projection 298 includes tapered end portions 299 configured to engage with connection jaw plates 276. Tapered end portions 299 are positioned adjacent to side walls 251.

Figure 19:
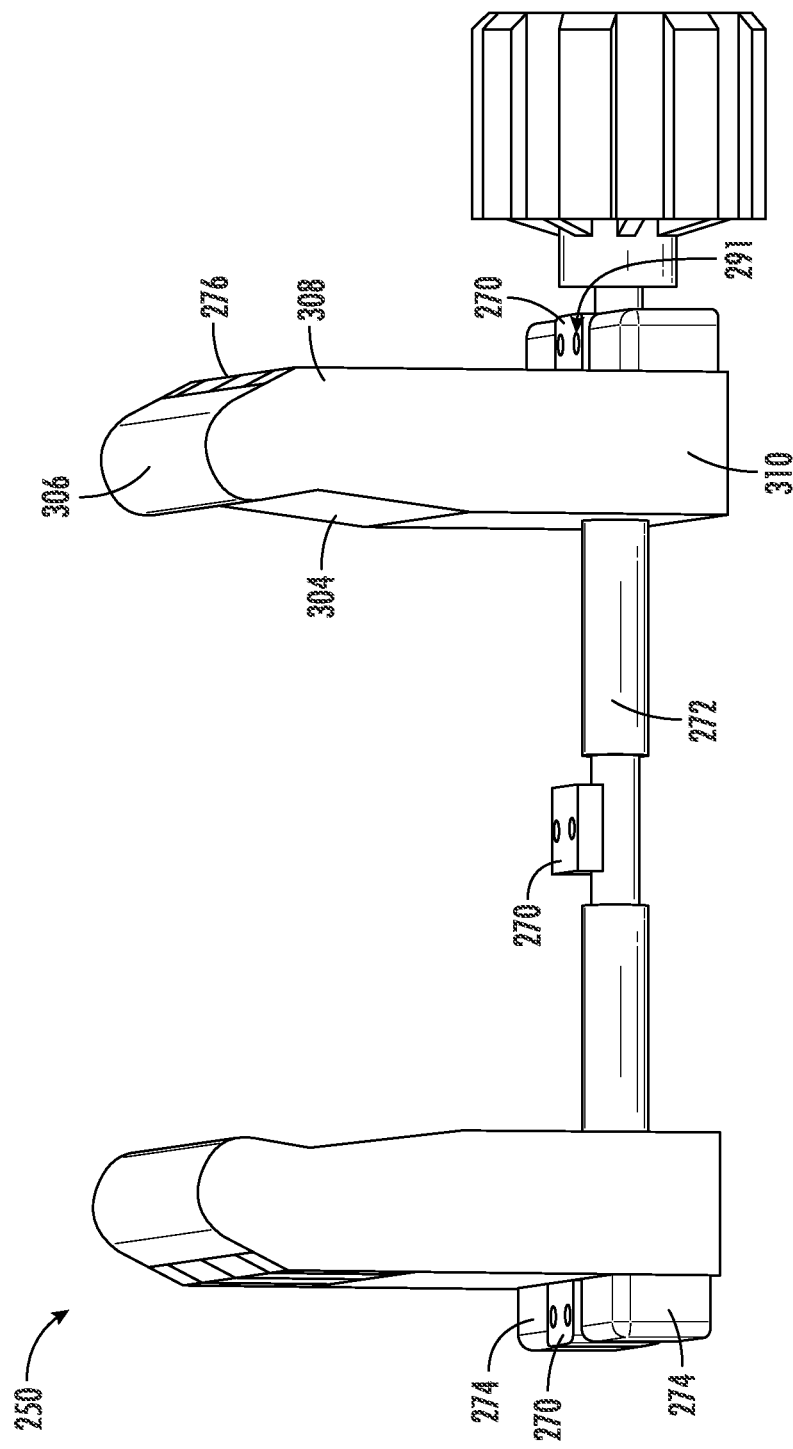
FIG. 19 is a detailed perspective view of a clamping connection mechanism of the rotary laser level wall mount of FIG. 17, according to an exemplary embodiment.

Referring to FIGS. 18-19, a detailed view of clamping connection mechanism 250 is shown according to an exemplary embodiment. Retention plates 270 limit movement (e.g., confine, enclose) adjustment rod 272 such that adjustment rod 272 is held in place within first channels 296 and second channel 300 to prevent misalignment of clamping connection mechanism 250. Retention plates 270 are coupled to body 212 by a plurality of fasteners 278, received within bores 302. Retention plates 270 each includes a pair of apertures 291 that correspond and align with bores 302. Connection jaw plates 276 are positioned within open recess portion 290 and specifically between opposing side walls 251. Each connection jaw plate 276 includes inward facing surface 304, rear facing curved surface 306, outward facing surface 308, bottom surface 311 (see e.g., FIG. 20) and a pair of side surfaces 310. One of the side surfaces 310 is upward facing towards rearward extending projection 48 while the opposing side surface 310 is downward facing toward feet 62.

Figure 20:
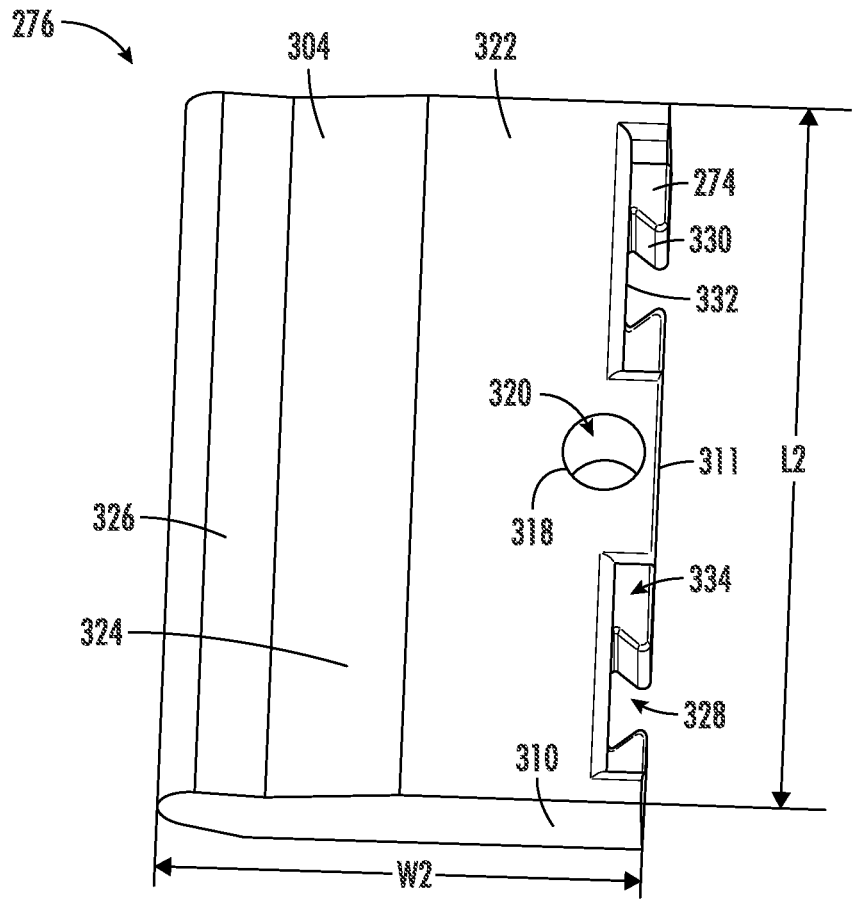
FIG. 20 is a detailed perspective view of a connection jaw plate of the rotary laser level wall mount of FIG. 17, according to an exemplary embodiment.
Figure 21:
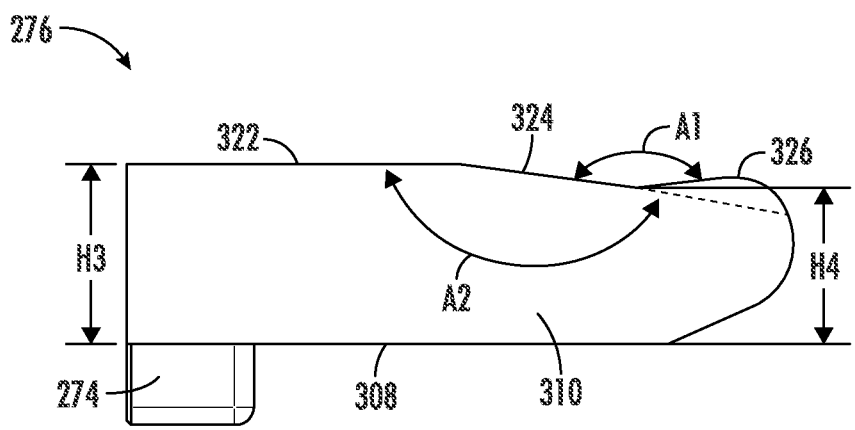
FIG. 21 is a plan view of the connection jaw plate of FIG. 20, according to an exemplary embodiment.

Referring to FIGS. 20-21, details of connection jaw plate or clamp 276 sizes and geometries that can be utilized with laser level wall mount 10 are shown, according to an exemplary embodiment. Applicant believes the geometry of the connection jaw plates described allows for connection to either flat or curved surfaces without causing a reduction in clamping force.

Inward facing surface 304 includes a flat and/or horizontal portion 322 (horizontal in the orientation shown in FIG. 21), a first angled portion 324 and a second angled portion 326. First angled portion 324 is positioned between horizontal portion 322 and second angled portion 326. Horizontal portion 322 of inward facing surface 304 includes an edge 318 defining a bore 320. Bore 320 extends between inward facing surface 304 outward facing surface 308 and is sized to receive adjustment rod 272. Horizontal portion 322 includes an upper recess 334 positioned adjacent to an outward extending projection 274. In a specific embodiment, upper recess 334 has a generally rectangular shape.

Each connection jaw plate 276 includes one or more outward extending projections 274 (i.e., extend away from outward facing surface 308) that allow for a secure connection between clamping connection mechanism 250 and body 212. Each outward extending projection 274 includes an attachment recess 328 allowing each connection jaw plate 276 to translate and/or slide along the dovetail projections 298 as the clamp adjustment screw knob 40 is turned. In other words, the engagement between the dovetail projections 298 and the connection jaw plates 276 allow the connection jaw plates 276 to move in a translational manner along the dovetail projection 298 as the clamp adjustment screw knob 40 is turned. Attachment recess 328 includes a recess wall surface 332 extending between a pair of inward facing, (i.e., toward recess wall surface 332), angled surfaces 330. Attachment recess 328 is sized and/or shaped to recess and engage with the dovetail projections 298 of body 212. Applicant believes the engagement between dovetail projections 298 and attachment recess 328 reduce and/or prevent clamping connection mechanism 250 from being pulled off of body 212.

A distance between the opposing side surfaces 310 defines a length of connection jaw plate 276, shown as L2. The distance between rear facing curved surface 306 and bottom surface 311 defines a width of clamp 276, shown as W2. In a specific embodiment, W2 is specifically between 55% and 75% of L2, and more specifically between 60% and 70% of L2. In a specific embodiment, W2 is between 62% and 66% of L2 and in such embodiments W2 is about 2.54 inches (e.g., 2.54 inches plus or minus 0.05 inches).

The distance between horizontal portion 322 of inward facing surface 304 and outward facing surface 308 defines a third height of connection jaw plate 276, shown as H3. A distance between inward facing surface 304 and outward facing surface 308 at the point first angled portion 324 and second angled portion 326 meet defines a fourth height of connection jaw plate 276, shown as H4. In a specific embodiment, H3 is specifically between 10% and 30% of L2, and more specifically between 12% and 22% of L2. In a specific embodiment, H3 is between 16% and 20% of L2 and in such embodiments H3 is about 0.787 inches (e.g., 0.689 inches plus or minus 0.005 inches). In a specific embodiment, H4 is specifically between 79% and 99% of H3, and more specifically between 85% and 95% of H3. In a specific embodiment, H4 is between 87% and 90% of H3 and in such embodiments H4 is about 0.611 inches (e.g. 0.611 inches plus or minus 0.005 inches).

An angle between first angled portion 324 and second angled portion 326 of connection jaw plate 276 is defined as an angle A1. In a specific embodiment, A1 is between 160° and 170° and in such an embodiment A1 is about 165.5° (e.g., 165.5° plus or minus 2°). The internal angle between horizontal portion 322 of inward facing surface 304 and first angled portion 324 of connection jaw plate 276 is defined as an angle A2. In a specific embodiment, A2 is between 165° and 175° and in such an embodiment A2 is about 172.7° (e.g., 172.7° plus or minus 2°).

Referring to FIGS. 22-27, another embodiment of the clamping connection mechanism, shown as clamping connection mechanism 350, that can be utilized with a laser level wall mount such as laser level wall mount 10 is shown. In general, clamping connection mechanism 350 is substantially the same as clamping connection mechanisms 50 and 350 except for the differences discussed herein. As will be discussed in greater detail below, instead of using jaw connection plates with a smooth surface, the jaw connection plates can include a raised portion and/or a plurality of projections (i.e., a textured portion). Applicant believes that in some embodiments, this type of the clamping surface provides a more secure attachment of clamping connection mechanism on a surface and/or object while maintaining a high clamping force.

Figure 22:
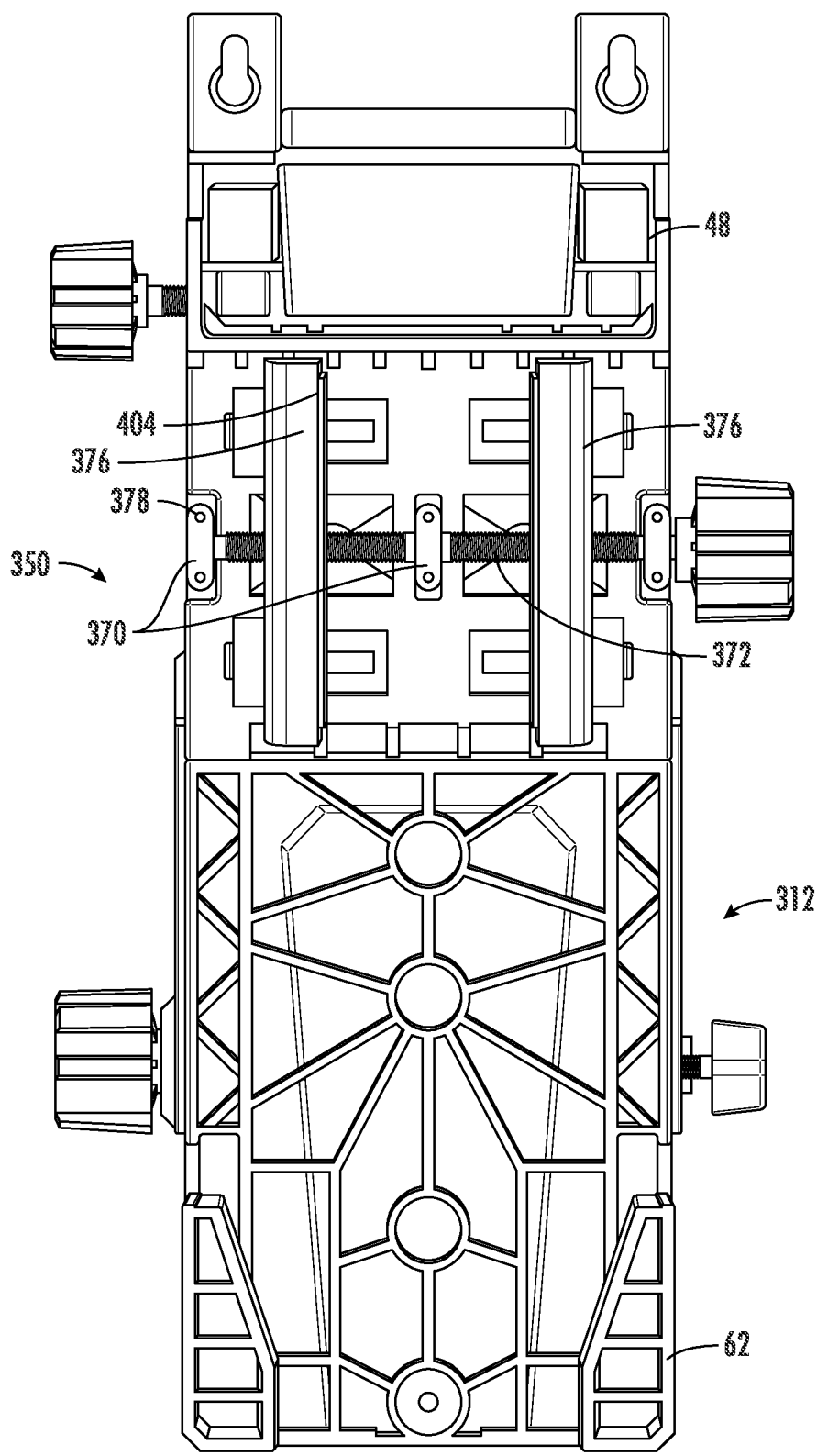
FIG. 22 is a rear perspective view of the rotary laser level wall mount of FIG. 1, according to another exemplary embodiment.
Figure 23A:
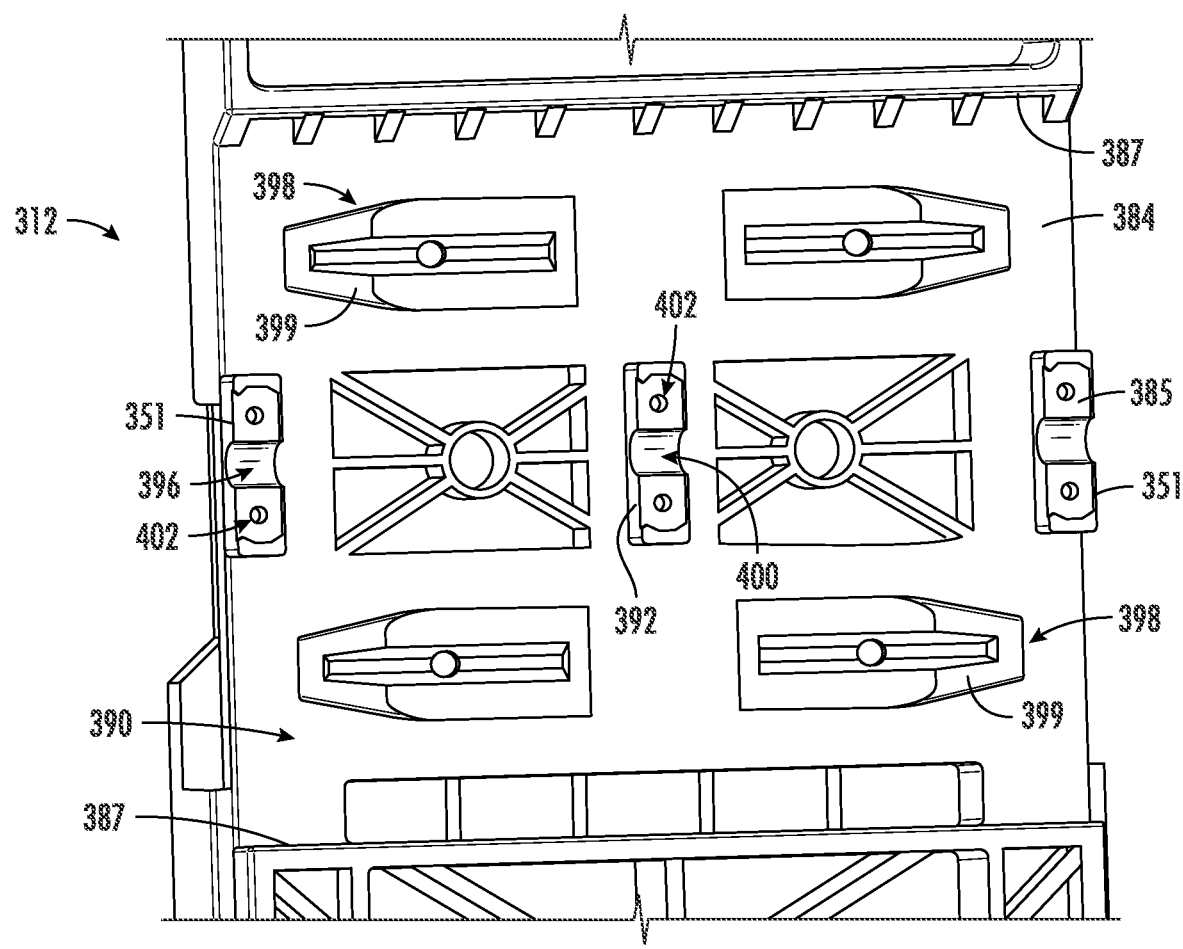
FIG. 23A is a detailed view of the rear surface of the rotary laser level wall mount of FIG. 22, according to an exemplary embodiment.
Figure 23B:
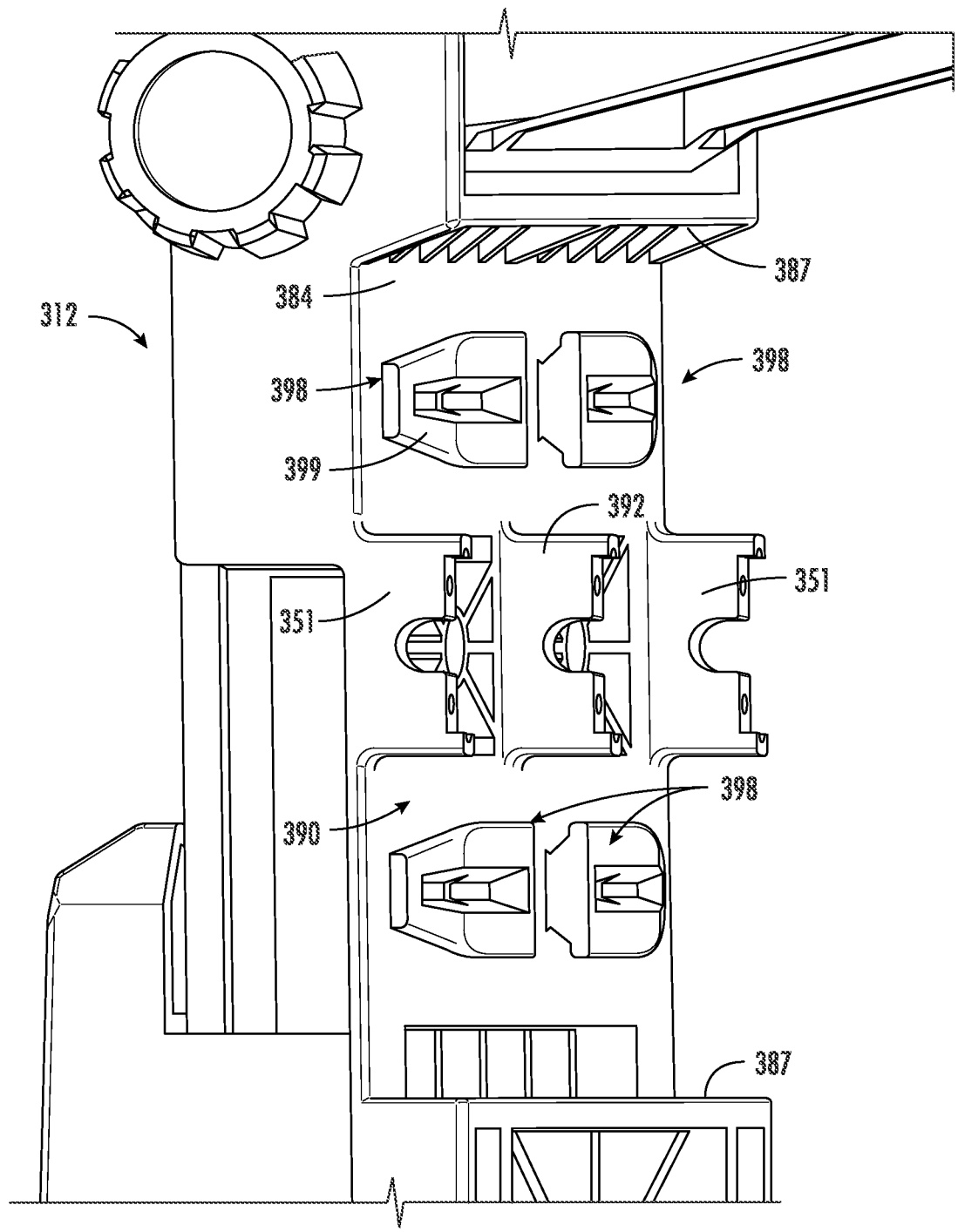
FIG. 23B is a detailed side perspective view of the rear surface of the rotary laser level wall mount of FIG. 22, according to an exemplary embodiment.

Referring to FIGS. 22-23B, the rear portion of a body 312 and the connection between body 312 and clamping connection mechanism 350 are shown. Connection jaw plates or clamps 376 each include an inward facing surface 404 that opposes the inward facing surface 404 of the opposing connection jaw plate 376. When a user turns clamp adjustment screw knob 40 the distance between the connection jaw plates 376, and specifically inward facing surfaces 404 is changed. When the user turns clamp adjustment screw knob 40 until the distance is a clamping distance (i.e., desired distance to clamp onto a surface or object), the connection jaw plates 376 are configured to engage a flat surface or a curved surface such that the mount 10 is supported from the flat or curved surface. Adjustment rod 372 extends between and couples the pair of connection jaw plates 376 together allowing for clamp adjustment screw knob 40 to move both connection jaw plates 376 at once. Screw knob 40 is coupled to an end of adjustment rod 372. For example, adjustment rod 372 can include includes both right-handed and left-handed threading to allow for movement of both connection jaw plates 376. In a specific embodiment the distance between connection jaw plates 376 is adjustable at least between 0.5 inches and 3 inches such that connection can be made to surfaces and/or materials with a variety of widths.

Referring to FIGS. 23A-B, body 312 includes an open recess portion 390. A rear surface 384 of body 312 extends across at least of portion of open recess portion 390. Connection jaw plates 376 extend outward from the rear surface 384 of the body 312. Recess portion 390 is defined at least partially by a pair of axially extending opposing inner surfaces 387. In a specific embodiment, axially extending opposing inner surfaces 387 are parallel to each other. Body 312 does not include longitudinally extending walls to connect the pair of axially extending inner surfaces 387. A pair of side walls 351 are coupled to rear surface 384 and positioned within open recess portion 390 between the pair of axially extending inner surfaces 387 such that side walls 351 extend in a perpendicular direction relative to inner surfaces 387. Side walls 351 each include a generally horizontal surface 385 that is parallel to rear surface 384. Each generally horizontal surface 385 includes a first channel 396 having a first geometry and configured to receive at least a portion of adjustment rod 372.

A central wall 392 is positioned in a parallel orientation to side walls 351 within the open recess portion 390 and in between the opposing side walls 351. Central wall 392 includes a generally horizontal surface 386 that is parallel to rear surface 384. Generally horizontal surface 386 includes a second channel 400 having a second geometry and configured to receive at least a portion of adjustment rod 372. In a specific embodiment, the second geometry of the second channel is different from the first geometry of the first channels. A plurality of retention plates 370 are coupled to body 312 and specifically to side walls 351 and central wall 392 by a plurality of fasteners 378 (e.g., screws, bolts, etc.). Fasteners 378 are received within bores 402.

One or more projections, shown as dovetail projections 398 are coupled to rear surface 384 of body 312 within open recess portion 390. In a specific embodiment, dovetail projections are molded onto rear surface 384. In the illustrated embodiment, four dovetail projections 398 are coupled to rear surface 384 (i.e., two upper projections and two lower projections). In other embodiments a different number of dovetail projections may be used (e.g., 1, 2, 3, etc.). As shown in FIG. 23B, each dovetail projection 398 includes tapered end portions 399 configured to engage with connection jaw plates 376. Tapered end portions 399 are positioned adjacent to side walls 351 (i.e., near the non-enclosed and/or open side of open recess 390 moving away from a centerline of body 312).

Referring to FIG. 24, a detailed view of clamping connection mechanism 350 is shown according to an exemplary embodiment. Retention plates 370 limit movement (e.g., confine, enclose) of adjustment rod 372 such that adjustment rod 372 is held in place within first channels 396 and second channel 400 to prevent misalignment of clamping connection mechanism 350. Retention plates 370 are coupled to body 312 by a plurality of fasteners 378, received within bores 402. Retention plates 370 each includes a pair of apertures 391 that correspond and align with bores 402. Connection jaw plates 376 are positioned within open recess portion 390 and specifically between opposing side walls 351. Each connection jaw plate 376 includes inward facing surface 404, rear facing curved surface 406, outward facing surface 408, bottom surface 412 (see e.g., FIG. 25) and a pair of side surfaces 410. One of the side surfaces 410 is upward facing towards rearward extending projection 48 while the opposing side surface 410 is downward facing toward feet 62.

Figure 25:
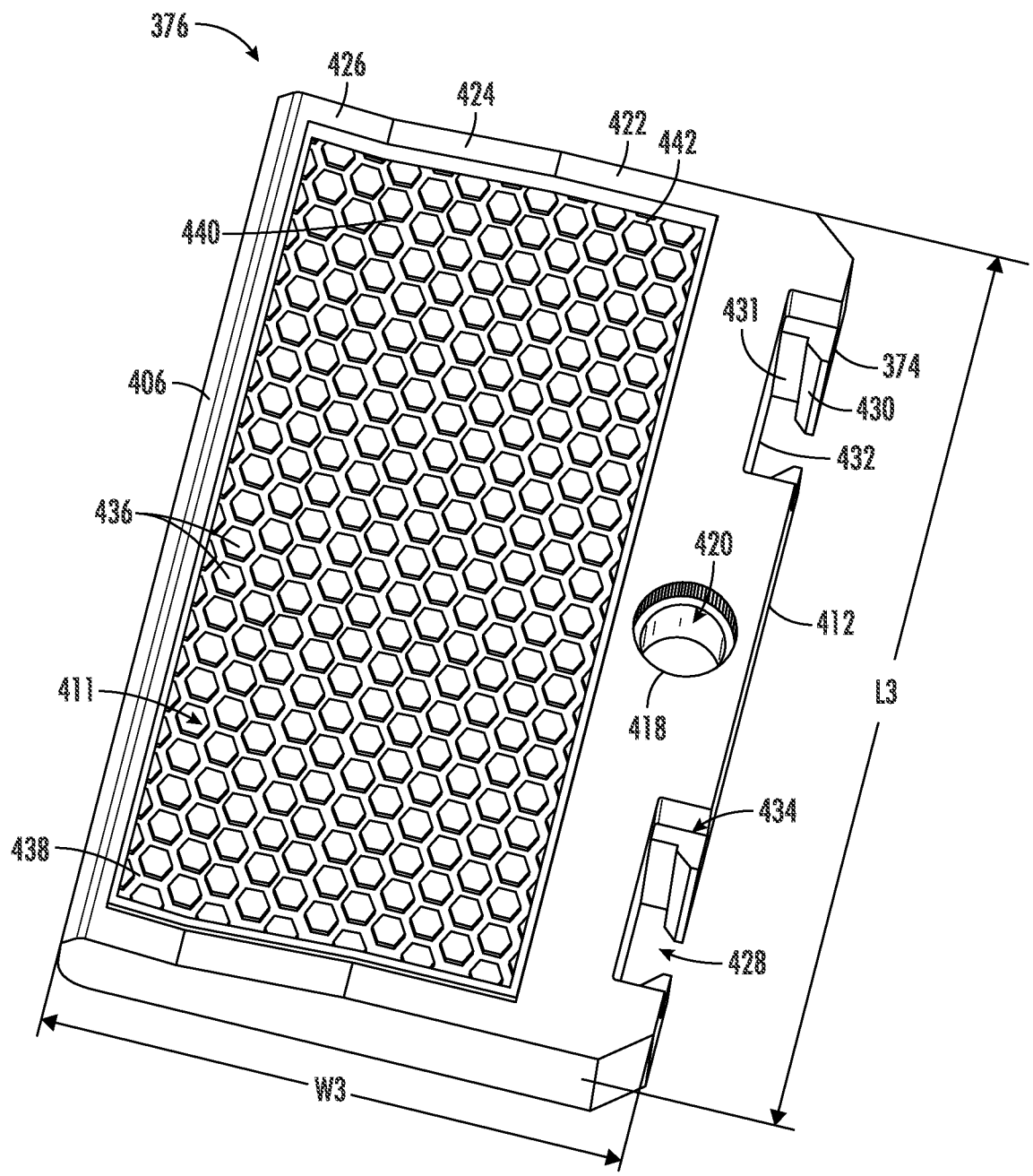
FIG. 25 is detailed perspective view of a connection jaw plate of the rotary laser level wall mount of FIG. 22, according to an exemplary embodiment.
Figure 26:
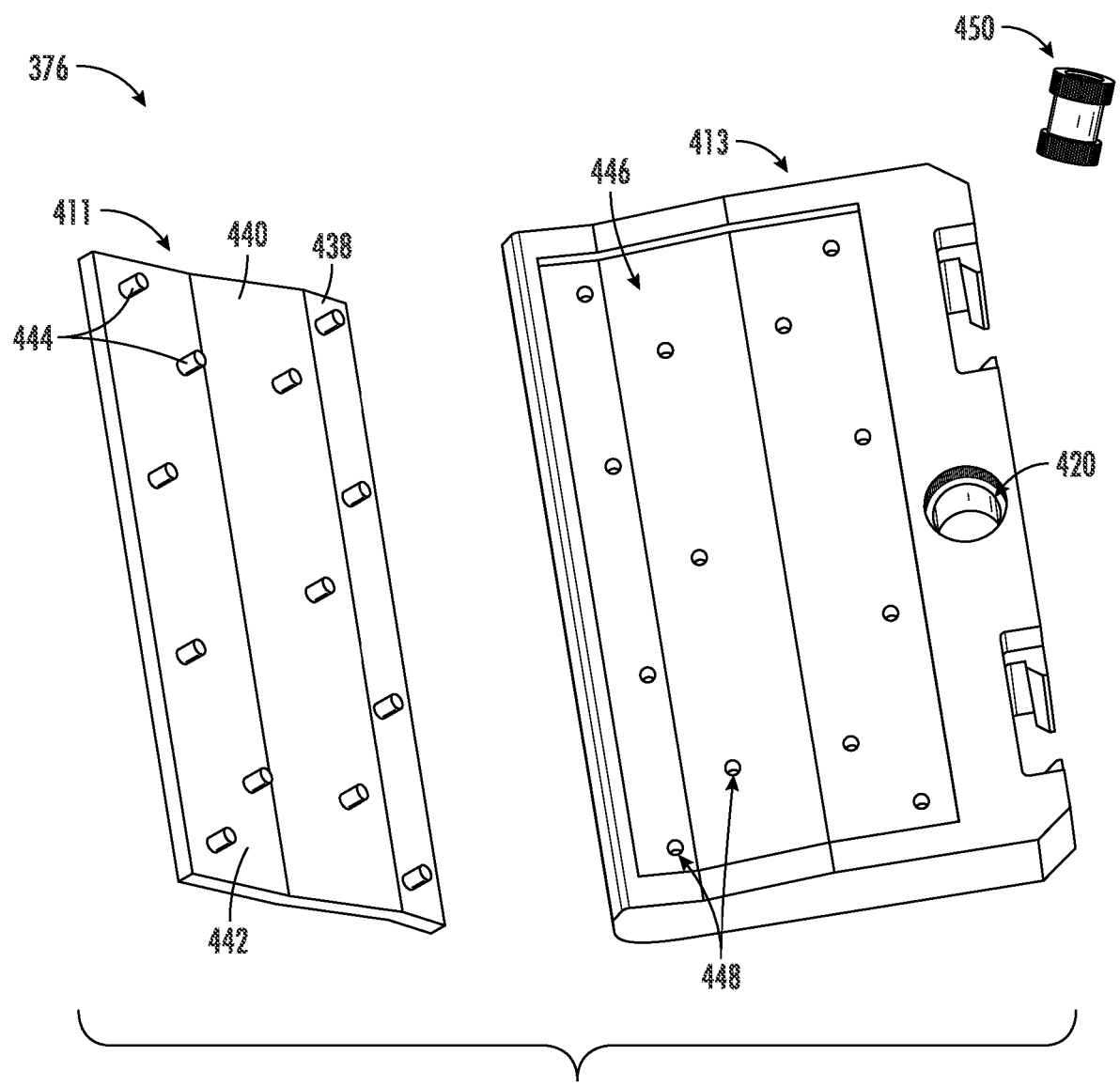
FIG. 26 is an exploded view of the jaw connection plate of the rotary laser level wall mount of FIG. 22, according to an exemplary embodiment.
Figure 27:
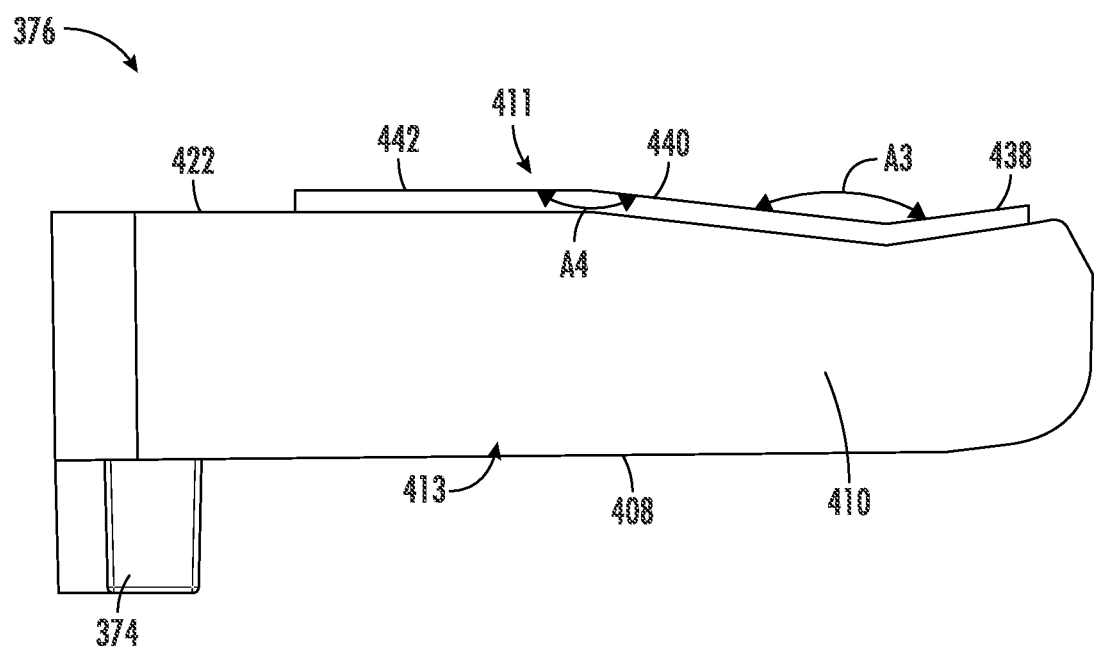
FIG. 27 is a plan view of the connection jaw plate of FIG. 25, according to an exemplary embodiment.

Referring to FIGS. 25-27, details of the connection jaw plate or clamp 376 sizes and geometries that can be utilized with laser level wall mount 10 are shown, according to an exemplary embodiment. Applicant believes the geometry of the connection jaw plates described allows for connection to either flat or curved surfaces without causing a reduction in clamping force. At least a portion of the engagement surface of the connection jaw plate includes a textured surface section. The textured surface section is configured to increase friction/gripping to reduce slippage relative to the connected surfaces (i.e., flat or curved surfaces). Applicant further believes the textured surface provides a desired level of clamping force and engagement while maintaining the strength and/or manufacturability of the connection jaw plates.

Note inward facing surface 404 is the surface of one connection jaw plate 376 that faces and/or opposes the inward facing surface 404 of an opposing connection jaw plate 376 (i.e., textured plates 411 oppose each other). Inward facing surface 404 includes a flat and/or horizontal portion 422 (horizontal in the orientation shown in FIG. 27), a first angled portion 424 and a second angled portion 426. First angled portion 424 is positioned between horizontal portion 422 and second angled portion 426. Horizontal portion 422 of inward facing surface 404 includes an edge 418 defining a bore 420. Bore 420 extends between inward facing surface 404 outward facing surface 408 and is sized to receive adjustment rod 372. In a specific embodiment, bore 420 includes a threaded connector 450 (see e.g., FIG. 26). Horizontal portion 422 includes an upper recess 434 positioned adjacent to an outward extending projection 374. In a specific embodiment, upper recess 434 has a generally rectangular shape.

Each connection jaw plate 376 includes one or more outward extending projections 374 (i.e., extend away from outward facing surface 408) that allow for a secure connection between clamping connection mechanism 350 and body 312. Each outward extending projection 374 includes an attachment recess 428 allowing each connection jaw plate 376 to translate and/or slide along the dovetail projections 298 as the clamp adjustment screw knob 40 is turned. In other words, the engagement between the dovetail projections 398 and the connection jaw plates 376 allow the connection jaw plates 376 to move in a translational manner along the dovetail projection 398 as the clamp adjustment screw knob 40 is turned. Attachment recess 428 includes a recess wall surface 432 extending between a pair of side surfaces 431 opposing each other and connected to inward facing, (i.e., toward recess wall surface 432), angled surfaces 430. Attachment recess 428 is sized and/or shaped to recess and engage with the dovetail projections 398 of body 312. Applicant believes the engagement between dovetail projections 398 and attachment recess 428 reduce and/or prevent clamping connection mechanism 350 from being pulled off of body 312.

Referring to FIG. 26, an exploded view of a connection jaw plate 376 is shown, according to an exemplary embodiment. Each connection jaw plate 376 includes a textured plate 411 and a body portion 413. Texture plate 411 is raised relative to body portion 413 (i.e., extends further inward toward opposing connection jaw plate). In a specific embodiment, textured plate 411 is coupled to body portion 413. In such an embodiment, textured plate 411 includes a plurality of projections 444 positioned on a surface facing body portion 413. Body portion 413 includes a recess 446 shaped and/or configured to receive textured plate 411 when connection jaw plate 376 is assembled. The inner surface of recess 446 includes a plurality of bores 448 configured to receive the plurality of projections 444 to couple and/or connect textured plate 411 to body portion 413.

Textured plate 411 includes a flat and/or horizontal portion 442, a first angled portion 440 and a second angled portion 438. First angled portion 440 is positioned between horizontal portion 442 and second angled portion 438. When connection jaw plate 376 is assembled, first angled portion 440 of textured plate 411 is aligned with first angled portion 424. Similarly, when connection jaw plate 376 is assembled, horizontal portion 442 is aligned with horizontal portion 422 and second angled portion 438 is aligned with second angled portion 426, Texture plate 411 further includes a plurality of protrusions and/or projections 436. Projections 436 are spaced on texture plate 411 such that there is a gap between adjacent and/or neighboring projections 436. In a specific embodiment, projections 436 have a hexagonal shape. In other embodiments, projections 436 may have a different shape (i.e., square, rectangular, polygonal, etc.).

Referring to FIG. 25, a distance between the opposing side surfaces 410 defines a length of connection jaw plate 376, shown as L3. The distance between rear facing curved surface 406 and bottom surface 412 defines a width of clamp 376, shown as W3. In a specific embodiment, the relationship between (i.e., the relative dimensions) W3 and L3 are the same as W1 and L1 such that W3 is specifically between 50% and 70% of L3. In a specific embodiment, the relationship between (i.e., the relative dimensions) W3 and L3 are the same as W2 and L2, such that W3 is specifically between 55% and 75% of L3. In another specific embodiment, the relationship between (i.e., the relative dimensions) W3 and L3 is different from W1 and L1 and W2 and L2.

Referring to FIG. 27, an angle between first angled portion 440 and second angled portion 438 of connection jaw plate 376 and specifically textured plate 411 is defined as an angle A3. In a specific embodiment, A3 is between 160° and 170° and in such an embodiment A3 is about 165.6° (e.g., 165.6° plus or minus 2°). The internal angle between horizontal portion 442 of inward facing surface 404 and first angled portion 440 of textured plate 411 is defined as an angle A4. In a specific embodiment, A4 is between 165° and 175° and in such an embodiment A2 is about 172.7° (e.g., 172.7° plus or minus 2°). In a specific embodiment, angle A3 is the same as the angle between first angled portion 424 and second angled portion 426 of connection jaw plate 376. In a specific embodiment, angle A4 is the same as the angle between horizontal portion 422 and first angled portion 440 of connection jaw plate 376.

It should be understood that the figures illustrate the exemplary embodiments in detail, and it should be understood that the present application is not limited to the details or methodology set forth in the description or illustrated in the figures. It should also be understood that the terminology is for the purpose of description only and should not be regarded as limiting.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein, the article "a" is intended to include one or more component or element, and is not intended to be construed as meaning only one. As used herein, "rigidly coupled" refers to two components being coupled in a manner such that the components move together in a fixed positional relationship when acted upon by a force.

Various embodiments of the disclosure relate to any combination of any of the features, and any such combination of features may be claimed in this or future applications. Any of the features, elements or components of any of the exemplary embodiments discussed above may be utilized alone or in combination with any of the features, elements or components of any of the other embodiments discussed above.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

While the current application recites particular combinations of features in the claims appended hereto, various embodiments of the invention relate to any combination of any of the features described herein whether or not such combination is currently claimed, and any such combination of features may be claimed in this or future applications. Any of the features, elements, or components of any of the exemplary embodiments discussed above may be used alone or in combination with any of the features, elements, or components of any of the other embodiments discussed above.

In various exemplary embodiments, the relative dimensions, including angles, lengths and radii, as shown in the Figures are to scale. Actual measurements of the Figures will disclose relative dimensions, angles and proportions of the various exemplary embodiments. Various exemplary embodiments extend to various ranges around the absolute and relative dimensions, angles and proportions that may be determined from the Figures. Various exemplary embodiments include any combination of one or more relative dimensions or angles that may be determined from the Figures. Further, actual dimensions not expressly set out in this description can be determined by using the ratios of dimensions measured in the Figures in combination with the express dimensions set out in this description.

What is claimed:

1. A mount for a laser projection device comprising:
a body portion including a front surface and a rear surface;
a platform, the platform having an adjustable position relative to the front surface of the body portion along a length of the body portion and including a mount configured to securely engage a laser projection device;
a clamping connection mechanism coupled to the rear surface of the body portion, the clamping connection mechanism comprising:
a pair of jaw connection plates extending outward from the rear surface of the body portion, each jaw connection plate including an inward facing surface that opposes the inward facing surface of the remaining jaw connection plate;
an adjustment rod, the adjustment rod extending between and coupling the pair of jaw connection plates together; and
a screw knob coupled to an end of the adjustment rod; and
a dovetail projection coupled to the rear surface of the body portion;
wherein each jaw connection plate further comprises an outward extending projection, the outward extending projection including an attachment recess configured to engage with the dovetail projection;
wherein, when the screw knob is turned, a distance between the pair of jaw connection plates is changed and wherein, when the distance is a clamping distance, the jaw connection plates are configured to engage a flat surface or a curved surface such that the mount is supported from the flat surface or the curved surface.

2. The mount of claim 1, wherein each inward facing surface comprises:
a horizontal portion;
a first angled portion; and
a second angled portion;
wherein the first angled portion is positioned between the horizontal portion and the second angled portion.

3. The mount of claim 2, wherein an angle A1 is defined between the first angled portion and the second angled portion of the inward facing surface and wherein A1 is between 160 degrees and 170 degrees.

4. The mount of claim 2, wherein an internal angle A2 is defined between the horizontal portion and the first angled portion of the inward facing surface and wherein A2 is between 165 degrees and 175 degrees.

5. The mount of claim 1, wherein the clamping connection mechanism is adjustable such that the clamping connection mechanism can hold a surface having a width between 0.5 inches and 3 inches.

6. The mount of claim 1, wherein the mount further comprises an upper clamping mechanism, the upper clamping mechanism comprising:
a pair of arms extending rearward, away from the body portion in a generally perpendicular direction;
a pair of rearward extending projections positioned below the pair of arms;
a connector coupled to the body portion; and
an upper screw knob coupled to the connector and configured to actuate the upper clamping mechanism;
wherein the pair of arms together with rearward extending projections act as a clamping structure such that pair of arms and rearward extending projections can be used to grasp a surface.

7. The mount of claim 6, wherein the upper clamping mechanism further includes a ball and an angled internal wall and wherein when the connector is advanced, the ball pushes against the angled internal wall such that a distance between the pair of arms and the pair of rearward extending projections is decreased.

8. A laser level wall mount comprising:
a body including a front surface and a rear surface;
a laser platform, the laser platform configured to couple to a laser level device and adjustable relative to the front surface of the body;
a clamping mechanism extending away from the rear surface of the body, the clamping mechanism comprising:
a pair of jaw connection plates extending outward from the rear surface of the body, each jaw connection plate including an inward facing surface, the inward facing surface configured to grasp an object;
an adjustment rod, the adjustment rod extending between and coupling the pair of jaw connection plates together; and
a screw knob coupled to an end of the adjustment rod;
a pair of feet extending away from the rear surface of the body, the pair of feet positioned below the clamping mechanism;
a dovetail projection coupled to the rear surface of the body; and
an attachment recess defined within each jaw connection plate such that the jaw connection plate moves in a translational manner along the dovetail projection as the screw knob is turned.

9. The laser level wall mount of claim 8, wherein each inward facing surface comprises:
a horizontal portion;
a first angled portion; and
a second angled portion;
wherein the first angled portion is positioned between the horizontal portion and the second angled portion.

10. The laser level wall mount of claim 9, wherein a distance between the horizontal portion of the inward facing surface and an outward facing surface defines a first height of the jaw connection plate and wherein a distance between the horizontal portion of the inward facing surface and an outward facing surface at a point where the first angled portion meets the second angled portion defines a second height of the jaw connection plate.

11. The laser level wall mount of claim 10, wherein the second height of the jaw connection plate is between 85% and 95% of the first height of the jaw connection plate.

12. The laser level wall mount of claim 8, further comprising an angle adjustment mechanism positioned below the laser platform, the angle adjustment mechanism configured to change an angle of the laser level wall mount relative to an outer surface of the object the laser level wall mount is holding.

13. The laser level wall mount of claim 12, wherein the angle adjustment mechanism includes:
a threaded connector extending through the body; and
an angle adjustment knob coupled to an end of the threaded connector.

14. The laser level wall mount of claim 13, wherein, when the angle adjustment knob is turned in a tightening direction, the threaded connector pushes against the outer surface of the object such that a distance between the outer surface of the object and a rear surface of each of the pair of feet is increased.

15. A laser level wall mount comprising:
a body including a front surface and a rear surface;
a laser platform, the laser platform adjustable relative to the front surface of the body and including a mount configured to securely engage a laser level device;
a clamping mechanism coupled to the rear surface of the body, the clamping mechanism comprising:
a pair of jaw connection plates extending outward from the rear surface of the body, each jaw connection plate including an inward facing surface, the inward facing surface comprising:
a horizontal portion;
a first angled portion; and
a second angled portion, the first angled portion positioned between the horizontal portion and the second angled portion;
an adjustment rod, the adjustment rod extending between and coupling the pair of jaw connection plates together; and
a screw knob coupled to an end of the adjustment rod;
a pair of feet extending away from the rear surface of the body, the pair of feet positioned below the clamping mechanism; and
a ceiling clamping mechanism, the ceiling clamping mechanism comprising:
a pair of arms extending rearward, away from the body in a generally perpendicular direction;
a pair of rearward extending projections positioned below the pair of arms;
a connector coupled to the body; and
an upper screw knob coupled to the connector and configured to actuate the ceiling clamping mechanism;
wherein the pair of arms together with rearward extending projections act as a clamping structure such that pair of arms and rearward extending projections together hold a surface.

16. The laser level wall mount of claim 15, further comprising an angle adjustment mechanism positioned below the laser platform, the angle adjustment mechanism configured to change an angle of the laser level wall mount relative to a surface the laser level wall mount is holding.

17. A mount for a laser projection device comprising:
a body portion including a front surface and a rear surface;
a platform, the platform having an adjustable position relative to the front surface of the body portion along a length of the body portion and including a mount configured to securely engage a laser projection device;

a clamping connection mechanism coupled to the rear surface of the body portion, the clamping connection mechanism comprising:
  a pair of jaw connection plates extending outward from the rear surface of the body portion, each jaw connection plate including an inward facing surface that opposes the inward facing surface of the remaining jaw connection plate;
  an adjustment rod, the adjustment rod extending between and coupling the pair of jaw connection plates together; and
  a screw knob coupled to an end of the adjustment rod; and
an upper clamping mechanism, the upper clamping mechanism comprising:
  a pair of arms extending rearward, away from the body portion in a generally perpendicular direction;
  a pair of rearward extending projections positioned below the pair of arms;
  a connector coupled to the body portion; and
  an upper screw knob coupled to the connector and configured to actuate the upper clamping mechanism;
wherein the pair of arms together with rearward extending projections act as a clamping structure such that pair of arms and rearward extending projections can be used to grasp a surface;
wherein, when the screw knob is turned, a distance between the pair of jaw connection plates is changed and wherein, when the distance is a clamping distance, the jaw connection plates are configured to engage a flat surface or a curved surface such that the mount is supported from the flat surface or the curved surface.

18. A laser level wall mount comprising:
a body including a front surface and a rear surface;
a laser platform, the laser platform adjustable relative to the front surface of the body and including a mount configured to securely engage a laser level device;
a clamping mechanism coupled to the rear surface of the body, the clamping mechanism comprising:
  a pair of jaw connection plates extending outward from the rear surface of the body, each jaw connection plate including an inward facing surface, the inward facing surface comprising:
    a horizontal portion;
    a first angled portion; and
    a second angled portion, the first angled portion positioned between the horizontal portion and the second angled portion;
  an adjustment rod, the adjustment rod extending between and coupling the pair of jaw connection plates together; and
  a screw knob coupled to an end of the adjustment rod;
a pair of feet extending away from the rear surface of the body, the pair of feet positioned below the clamping mechanism; and
an angle adjustment mechanism positioned below the laser platform, the angle adjustment mechanism configured to change an angle of the laser level wall mount relative to a surface the laser level wall mount is holding.

* * * * *